United States Patent
Gupta et al.

(10) Patent No.: US 12,522,236 B2
(45) Date of Patent: Jan. 13, 2026

(54) SAFE VEHICLE BACKUP NAVIGATION

(71) Applicant: TOYOTA MOTOR ENGINEERING & MANUFACTURING NORTH AMERICA, INC., Plano, TX (US)

(72) Inventors: Rohit Gupta, Santa Clara, CA (US); Qi Chen, San Jose, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 321 days.

(21) Appl. No.: 18/136,203

(22) Filed: Apr. 18, 2023

(65) Prior Publication Data

US 2024/0351599 A1 Oct. 24, 2024

(51) Int. Cl.
| | |
|---|---|
| *B60Q 1/00* | (2006.01) |
| *B60W 30/095* | (2012.01) |
| *B60W 30/16* | (2020.01) |
| *B60W 30/18* | (2012.01) |
| *B60W 40/105* | (2012.01) |
| *B60W 50/14* | (2020.01) |

(52) U.S. Cl.
CPC ........ *B60W 50/14* (2013.01); *B60W 30/0956* (2013.01); *B60W 30/16* (2013.01); *B60W 30/18036* (2013.01); *B60W 40/105* (2013.01); *B60W 2050/146* (2013.01); *B60W 2520/06* (2013.01); *B60W 2554/4044* (2020.02); *B60W 2554/80* (2020.02); *B60W 2556/35* (2020.02); *B60W 2556/40* (2020.02)

(58) Field of Classification Search
CPC .. B60W 50/14; B60W 30/0956; B60W 30/16; B60W 30/18036; B60W 40/105; B60W 2050/146; B60W 2520/06; B60W 2554/4044; B60W 2554/80; B60W 2556/35; B60W 2556/40
See application file for complete search history.

(56) References Cited

U.S. PATENT DOCUMENTS

| | | | | |
|---|---|---|---|---|
| 6,615,137 | B2 * | 9/2003 | Lutter | G08G 1/162 340/436 |
| 7,830,243 | B2 * | 11/2010 | Buckley | G08G 1/166 340/436 |
| 8,217,773 | B2 * | 7/2012 | Matsumoto | B60Q 9/007 340/436 |
| 9,855,894 | B1 | 1/2018 | Khorasani | |
| 10,332,322 | B2 | 6/2019 | Nix | |
| 10,427,655 | B2 | 10/2019 | Nix | |
| 10,490,079 | B2 * | 11/2019 | Schild | G01S 7/006 |

(Continued)

FOREIGN PATENT DOCUMENTS

| | | |
|---|---|---|
| EP | 3497925 B1 | 11/2022 |
| WO | 2019152888 A1 | 8/2019 |

*Primary Examiner* — Toan N Pham

(57) ABSTRACT

An example operation includes one or more of receiving, by a processor, first data from a first sensor and second data from a second sensor, on a vehicle, receiving, by the processor, third data from a sensor on a further vehicle, wherein the third data is not observable by the first sensor, interworking, by the processor, the first data, the second data, and the third data, and superimposing, by the processor, the interworked first data, second data, and third data on a display of the vehicle.

17 Claims, 27 Drawing Sheets

(56) References Cited

U.S. PATENT DOCUMENTS

| | | |
|---|---|---|
| 10,551,838 B2 | 2/2020 | Liu et al. |
| 10,843,686 B2 | 11/2020 | Mullins |
| 11,210,537 B2 | 12/2021 | Koivisto et al. |
| 2008/0306666 A1* | 12/2008 | Zeng ............... B60Q 9/006 701/70 |
| 2020/0294401 A1 | 9/2020 | Kerecsen |
| 2020/0364953 A1 | 11/2020 | Simoudis |
| 2021/0356279 A1 | 11/2021 | Szigeti |
| 2022/0155093 A1 | 5/2022 | Fear |
| 2022/0276914 A1 | 9/2022 | Kundu et al. |

* cited by examiner

265

300

340

640

SAFE VEHICLE BACKUP NAVIGATION

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer located on and/or off the transport.

SUMMARY

One example embodiment provides a method that includes one or more of receiving, by a processor, first data from a first sensor and second data from a second sensor, on a vehicle, receiving, by the processor, third data from a sensor on a further vehicle, wherein the third data is not observable by the first sensor, interworking, by the processor, the first data, the second data, and the third data, and superimposing, by the processor, the interworked first data, second data, and third data on a display of the vehicle.

Another example embodiment provides a system that includes a memory communicably coupled to a processor, wherein the processor performs one or more of receive, by a processor, first data from a first sensor and second data from a second sensor, on a vehicle, receive, by the processor, third data from a sensor on a further vehicle, wherein the third data is not observable by the first sensor, interwork, by the processor, the first data, the second data, and the third data, and superimpose, by the processor, the interworked first data, second data, and third data on a display of the vehicle.

A further example embodiment provides a computer readable storage medium comprising instructions, that when read by a processor, cause the processor to perform one or more of receiving, by a processor, first data from a first sensor and second data from a second sensor, on a vehicle, receiving, by the processor, third data from a sensor on a further vehicle, wherein the third data is not observable by the first sensor, interworking, by the processor, the first data, the second data, and the third data, and superimposing, by the processor, the interworked first data, second data, and third data on a display of the vehicle.

DETAILED DESCRIPTION

Figure 1A:
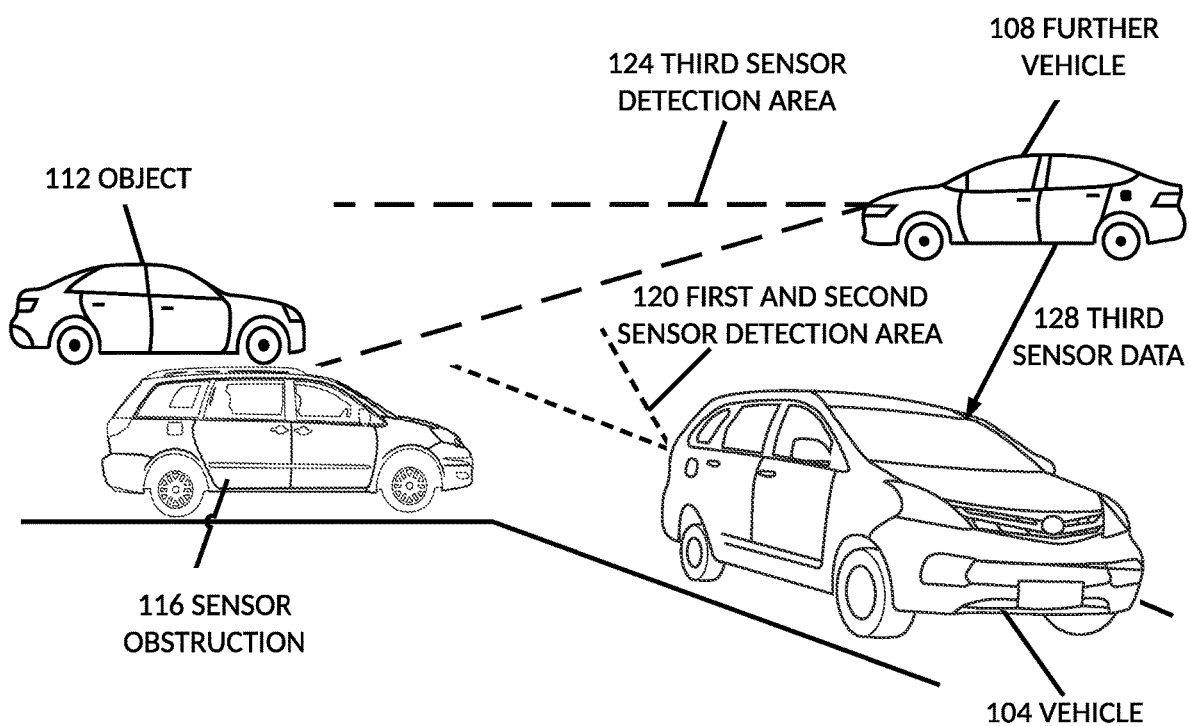
FIG. 1A illustrates an example of safe vehicle backup navigation, according to example embodiments.

It will be readily understood that the instant components, as generally described and illustrated in the figures herein, may be arranged and designed in a wide variety of different configurations. Thus, the following detailed description of the embodiments of at least one of a method, apparatus, computer readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer readable medium or a non-transitory computer readable storage medium.

Communications between the transport(s) and certain entities, such as remote servers, other transports and local computing devices (e.g., smartphones, personal computers, transport-embedded computers, etc.) may be sent and/or received and processed by one or more 'components' which may be hardware, firmware, software or a combination thereof. The components may be part of any of these entities or computing devices or certain other computing devices. In one example, consensus decisions related to blockchain transactions may be performed by one or more computing devices or components (which may be any element described and/or depicted herein) associated with the transport(s) and one or more of the components outside or at a remote location from the transport(s).

The instant features, structures, or characteristics described in this specification may be combined in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one example. Thus, appearances of the phrases "example embodiments", "in some embodiments", "in other embodiments," or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication, even if the depicted connection is a one-way or two-way arrow. In the current solution, a vehicle or transport may include one or more of cars, trucks, walking area battery electric vehicle (BEV), e-Palette, fuel cell bus, motorcycles, scooters, bicycles, boats, recreational vehicles, planes, and any object that may be used to transport people and or goods from one location to another.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer readable medium, devices, and/or networks, which provide at least one of a transport (also referred to as a vehicle or car herein), a data collection system, a data monitoring system, a verification system, an authorization system, and a vehicle data distribution system. The vehicle status condition data received in the form of communication messages, such as wireless data network communications and/or wired communication messages, may be processed to identify vehicle/transport status conditions and provide feedback on the condition and/or changes of a transport. In one example, a user profile may be applied to a particular transport/vehicle to authorize a current vehicle event, service stops at service stations, to authorize subsequent vehicle rental services, and enable vehicle-to-vehicle communications.

Within the communication infrastructure, a decentralized database is a distributed storage system which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes, or peer nodes. Each peer maintains a copy of the database records, and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In public or permissionless blockchains, anyone can participate without a specific identity. Public blockchains can involve cryptocurrencies and use consensus-based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol produces an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry proposals to an ordering service (e.g., ordering node). Another type of node is a peer node, which can receive client submitted entries, commit the entries and maintain a state and a copy of the ledger of blockchain entries. Peers can also have the role of an endorser. An ordering-service-node or orderer is a node running the communication service for all nodes and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which stores an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle. This data is forwarded to a management server for review and action. A sensor may be located on one or more of the interior of the transport, the exterior of the transport, on a fixed object apart from the transport, and on another transport proximate the transport. The sensor may also be associated with the transport's speed, the transport's braking, the transport's acceleration, fuel levels, service needs, the gear-shifting of the transport, the transport's steering, and the like. A sensor, as described herein, may also be a device, such as a wireless device in and/or proximate to the transport. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach could not be implemented on a traditional centralized database.

Various driving systems of the instant solution can utilize software, an array of sensors as well as machine learning functionality, light detection and ranging (Lidar) projectors, radar, ultrasonic sensors, etc. to create a map of terrain and road that a transport can use for navigation and other purposes. In some embodiments, GPS, maps, cameras, sensors and the like can also be used in autonomous vehicles in place of Lidar.

The instant solution includes, in certain embodiments, authorizing a vehicle for service via an automated and quick authentication scheme. For example, driving up to a charging station or fuel pump may be performed by a vehicle operator or an autonomous transport and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing transport-related data and transactions.

Any of the actions described herein may be performed by one or more processors (such as a microprocessor, a sensor, an Electronic Control Unit (ECU), a head unit, and the like), with or without memory, which may be located on-board the transport and/or or off-board the transport (such as a server, computer, mobile/wireless device, etc.). The one or more processors may communicate with other memory and/or other processors on-board or off-board other transports to utilize data being sent by and/or to the transport. The one or more processors and the other processors can send data, receive data, and utilize this data to perform one or more of the actions described or depicted herein.

FIG. 1A illustrates an example drawing of safe vehicle backup navigation, according to example embodiments. A system 100 may include a vehicle 104, one or more further vehicles 108, and an object 112. The vehicle 104 and the further vehicles 108 may include cars, trucks, recreational vehicles, construction vehicles, motorcycles, mopeds, powered bicycles, trains, aircraft, and the like. In one embodiment, the vehicle 104 and the further vehicle 108 may be at least partially powered by electric energy (i.e., hybrid vehicles (PHEVs) or electric vehicles (EVs), etc.). Vehicles 104 and further vehicles 108 may be used to transport one or more vehicle occupants and/or cargo items, and one or more vehicle occupants may be associated with the vehicle 104 and/or the further vehicles 108. Vehicle occupants may have occupant devices such as smartphones, smartwatches, and the like. In one embodiment, the vehicle 104 and/or the further vehicles 108 may be self-driving vehicles.

The object 112 may be a moving object having a path or trajectory that may intersect the vehicle 104 while backing up, or may experience a "near miss" that may cause an emergency avoidance maneuver by either the vehicle 104 and/or the object 112. The object 112 may include one or more pedestrians, a further vehicle 108, a scooter, a moped, a motorcycle, a bicycle, and the like.

In one embodiment, the vehicle 104 may be backing up or reversing. For example, the vehicle 104 may be reversing on a driveway before entering a roadway at the end of the driveway or backing out of a parking space. In one embodiment, the vehicle 104 may detect a change to initiate reverse movement, such as moving a shifter of the vehicle 104 from a "Park" to a "Reverse" position. Upon detecting a desired reverse movement of the vehicle 104, the vehicle 104 may activate two or more sensors that provide data from a rearward orientation of the vehicle 104 (e.g., usually on a rear surface of the vehicle 104). In one embodiment, a first rear sensor may be a camera that provides images of areas to the rear of the vehicle 104. The first sensor may provide first data to one or more processors of the vehicle 104. In one embodiment, a second rear sensor may be a Radar or Lidar device that provides location and speed data of various moving or non-moving objects and further vehicles 108 behind the vehicle 104. The location and speed data may provide information related to object position, distance, speed of movement, and trajectory/direction from detected objects or further vehicles 108. The second sensor may provide second data to one or more processors of the vehicle 104. The data from the first and the second sensors may be related to a first and second sensor detection area 120 to the rear of the vehicle 104.

In one embodiment, the first and second sensors may provide first and second data to one or more vehicle processors that may provide camera images and graphics/icons to a vehicle display, such as a head unit display. The first and second sensors may have a limited first and second sensor detection area 120, and the resulting data may not be able to provide useful images about all objects 112 or further vehicles 108 behind the vehicle 104. For example, the first and/or second sensors may have a limited detection angle (e.g., 60 degrees to either side) that may be unable to detect objects 112 and/or further vehicles 108 that are outside the limited detection angle. In another embodiment, there may be a sensor obstruction 116 behind the vehicle 104 that may limit detection of objects 112 and/or further vehicles 108 that are masked by the sensor obstruction 116. The sensor obstruction 116 may be stationary or moving and there may be multiple sensor obstructions 116 behind the vehicle 104. Sensor obstructions 116 may include parked vehicles, moving vehicles, buildings or structures, trees and shrubs, and the like. FIG. 1A illustrates a parked vehicle that is a sensor obstruction 116 masking a moving object 112.

Because the vehicle 104 may be unable to detect the object 112 as the vehicle 104 backs up, there is a need to obtain other data that may allow the vehicle 104 and vehicle occupants to become aware of objects 112 that the first and second data do not include. In one embodiment, there may be one or more further vehicles 108 that are able to detect the object 112 using one or more sensors that provide third sensor data 128. For example, the further vehicle 108 may have a radar sensor mounted near a front bumper or grille of the further vehicle 108. The third sensor may have a third sensor detection area 124 that may encompass one or more objects 112 that the first and second sensors of the vehicle 104 may not be able to detect. A processor associated with the further vehicle 108 may obtain third data from the third sensor and transmit the third sensor data 128 to a processor associated with the vehicle 104. The processor associated with the vehicle 104 may integrate the received third data 128 with the first and second data and display the integrated data on one or more displays of the vehicle 104, such as a head unit display or an occupant device display. In another embodiment, the processor associated with the vehicle 104 may present the integrated data audibly to one or more occupants of the vehicle 104.

Figure 1B:
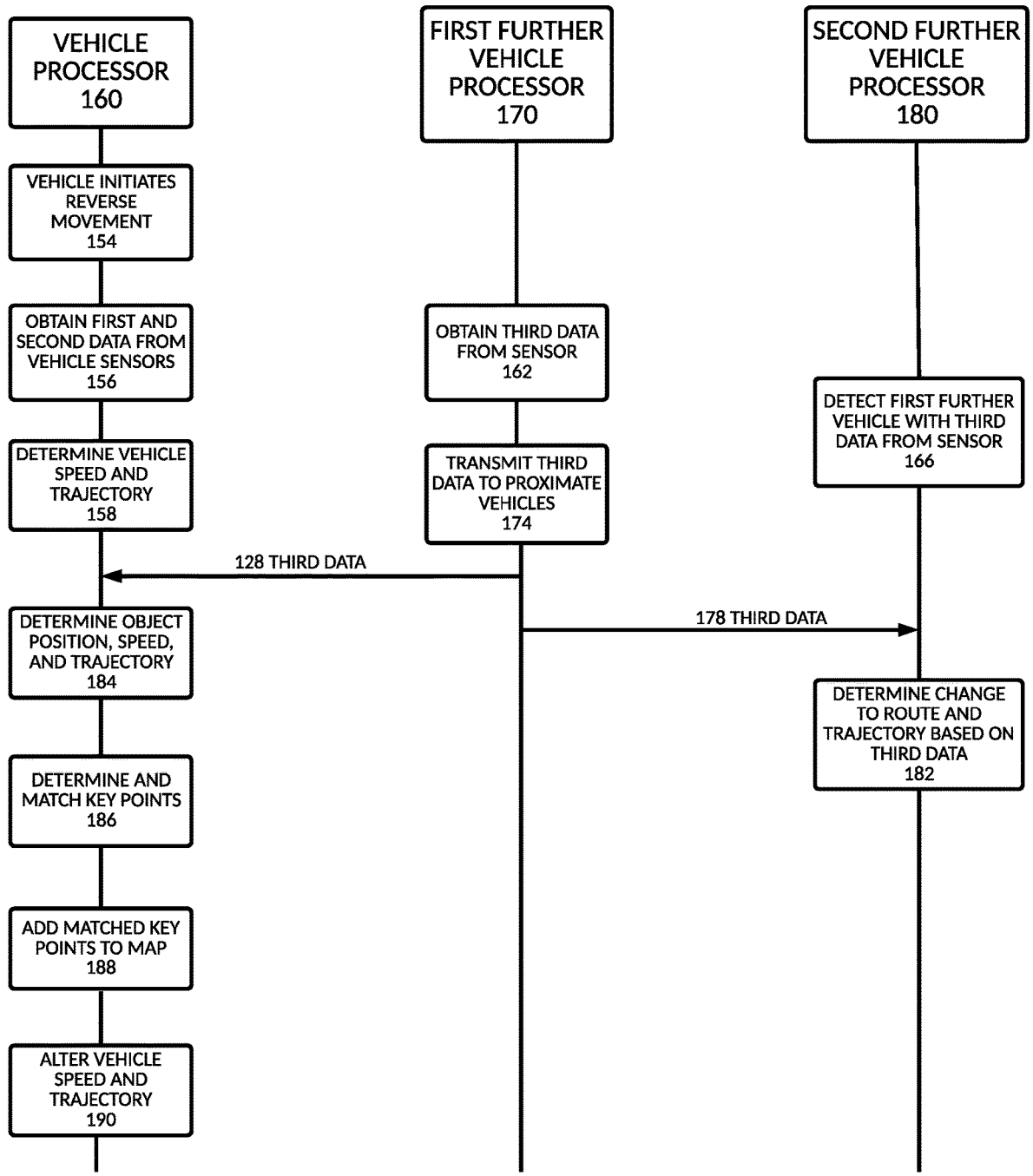
FIG. 1B illustrates a further example of a system utilizing safe vehicle backup navigation, according to example embodiments.

FIG. 1B illustrates an example flow of a system utilizing safe vehicle backup navigation, according to example embodiments. A system 150 may include a vehicle processor 160, a first further vehicle processor 170, and a second further vehicle processor 180. The vehicle processor 160 may be associated with the vehicle 104, the first further vehicle processor 170 may be associated with a first further vehicle 108 (i.e., further vehicle 108 of FIG. 1A), and the second further vehicle processor 180 may be associated with a second further vehicle 108 (e.g., another vehicle traveling behind further vehicle 108 of FIG. 1A). The vehicle processor 160, the first further vehicle processor 170, and the second further vehicle processor 180 may each include a navigation processor, a communication processor, a head unit processor, an ECU processor, a sensor processor, a combination of processors, and the like. The vehicle processor 160, the first further vehicle processor 170, and the second further vehicle processor 180 may communicate over wireless communication media, such as via Wi-Fi, Bluetooth, cellular, DSRC or C-V2X (Vehicle-to-Everything protocols), other wireless communication interfaces, and the like.

In one embodiment, the vehicle processor 160 may detect the vehicle 104 initiating reverse movement 154, such as backing out of a driveway, alleyway, or a parking space. The vehicle processor 160 may determine a backing up speed of the vehicle 104 from an ECU or other processor.

In one embodiment, in response to the vehicle processor 160 detecting the vehicle 104 initiating reverse movement 154, the vehicle processor 160 may obtain first and second data from sensors of the vehicle 156. For example, one of the first and second data may be from a rear-facing camera affixed to a rear surface of the vehicle 104 and the other of the first and the second data may be from a rear-facing Radar or Lidar sensor affixed to the rear surface of the vehicle 104. For example, a sensor processor may transmit images from the rear-mounted camera and a rear-mounted Radar/Lidar sensor to the vehicle processor 160.

In one embodiment, the vehicle processor 160 may receive the first and second data 156 and determine the speed and trajectory of the vehicle 158. The rear-oriented Radar or Lidar sensor may capture a series of data samples at time intervals for the stationary objects behind the vehicle 104 (e.g., trees, sensor obstructions 116, and the like). Each data sample may indicate a distance from stationary objects as the vehicle 104 moves. From the data samples, the first further vehicle processor 170 may determine the speed and the trajectory for the vehicle 158. In another embodiment, the vehicle processor 160 may determine the speed and trajectory for the vehicle 158 from a speed sensor or ECU of the vehicle 104 and a change in GPS coordinates from a GPS receiver of the vehicle 104.

In one embodiment, while the vehicle 104 is moving in reverse, a first further vehicle 108 may be approaching the vehicle 104 along a roadway that intersects a path of the vehicle 104. For example, a first further vehicle processor 170 of the further vehicle 108 may obtain third data from a front-mounted sensor 162. The further vehicle 108 may have a front-mounted Radar or Lidar sensor that obtains Radar or Lidar data within a third sensor detection area 124. The Radar or Lidar data may include a location and distance from the further vehicle 108 for one or more moving or stationary objects 112, 116. The third sensor detection area 124 may include an object 112 that may be outside a first and second sensor detection area 120 or blocked from the first and second sensors by one or more sensor obstructions 116.

In one embodiment, the first further vehicle processor 170 may wirelessly transmit third data to proximate vehicles 174. For example, the vehicle processor 170 may broadcast the third data 128 over a Bluetooth AURACAST or Broadcast Wi-Fi connection to other processors within a relatively short range. For example, the vehicle 104 and further vehicles 108 (and possibly the object 112 and/or further vehicles 108 that may be sensor obstructions 116, as well) may be pre-configured to accept broadcast transmissions with a pre-defined signature. If the vehicle 104 or further vehicles 108 receive third data in a broadcast transmission, they may check a preamble of the data for the pre-defined signature. If the signature is not present, the vehicle processor 160 or the further vehicle processor 170, 180 may ignore the transmission. If the signature is present, the vehicle processor 160 or the further vehicle processor 170, 180 may accept and process the transmission.

In one embodiment, the first further vehicle processor 170 may transmit third data 128 to the vehicle processor 160 and may transmit third data 178 to the second further vehicle processor 180. The third data 128 and/or the third data 178 may include a position, a speed, and a direction of the vehicle 104, a position, a speed, and direction of the object 112, a predicted intersection point between the vehicle 104 and the object 112, and/or a predicted intersection time between the vehicle 104 and the object 112 (e.g., intersection/collision in 3.5 seconds). A second further vehicle 108 may be following the (first) further vehicle 108 on a roadway and may be obtaining its own third data from a forward-mounted Radar or Lidar sensor 166. For example, the second further vehicle processor 180 may obtain its own third data that may include the first further vehicle 108 and possibly one or more additional further vehicles. However, the one or more additional vehicles may not include the object 112 because the first further vehicle 108 may serve as a sensor obstruction 116 to the object 112. The second further vehicle 108 may rely on third data 178 to notify the second further vehicle processor 180 of the vehicle 104 and a potential intersection or collision with the object 112. In response to receiving the third data 178 from the first further vehicle processor 170, the second further vehicle processor 180 may determine a change to a route and a trajectory, based on the third data 182. The route and/or trajectory may include slowing down, stopping, or a change in direction to avoid the vehicle 104, the object 112, and/or the first further vehicle 108.

In one embodiment, the vehicle processor 160 may receive the third data 128 and determine the position, speed, and trajectory of the object 184. A forward-oriented Radar or Lidar sensor of the further vehicle 108 may capture a series of data samples at time intervals for the object 112. Each data sample may indicate a position of the object 112, as it moves over time intervals. From the data samples, the vehicle processor 160 may determine a position, a speed, and a trajectory for the object 184.

In one embodiment, the vehicle processor 160 may determine and match key points 186. Key points may represent repeatable locations under different viewpoints, such as the vehicle's perspective or a further vehicle's perspective. Key points may also apply to fixed sensors, such as a fixed camera with a view of an intersection. Repeatable locations include specific locations that may be present in camera images or Radar/Lidar data. Repeatable locations identify common reference points that may be used to orient data from different sensors with different orientations, such as a rear-facing camera or Radar/Lidar of the vehicle 104, a front-facing Radar/Lidar of the first further vehicle 108, and a front facing Radar/Lidar of a second further vehicle 108. Repeatable locations may include parked vehicles, light or traffic signal poles, specific locations of buildings, and the like.

The first data, the second data, and third data may include a same or different number of repeatable locations. Some repeatable locations may be common to the first data, the second data, and the third data, while other repeatable locations may not be. For example, a light pole may be within the field of view of a third sensor of a first further vehicle 108, but not in the field of view of the first and second sensors of the vehicle 104. Referring to FIG. 1A, repeatable locations may include moving objects, including the object 112, the vehicle 104, the first further vehicle 108, and the second further vehicle 108. Repeatable locations may also include stationary or non-moving objects, including the sensor obstruction 116.

In one embodiment, the vehicle processor 160 may interwork the first data, the second data, and the third data by matching key points of nearby vehicles (i.e., in the third data 128) to generate a key point map 188, using accurate location data from odometry. For example, the second data from a rear-facing Radar/Lidar of the vehicle 104 may identify the sensor obstruction 116 at a position, a distance, and an orientation from the vehicle 104. The received third data 128 may identify the sensor obstruction 116 at a different position, distance, and orientation from the first further vehicle 108. From the different distance and orientation, the vehicle processor 160 may infer a position of the first further vehicle 108 relative to the sensor obstruction 116 and the vehicle 104. The third data 128 may also identify the object 112 at a position, distance, speed, and orientation from the first further vehicle 108. The vehicle processor 160 may use this information to build the key point map 188, including vectors for moving entities. For example, the vehicle processor 160 may assign a first vector to the vehicle 104 with a first position, speed, and direction, a second vector to the first further vehicle 108 with a second position, speed, and direction, and a third vector to the object 112 with a third position, speed, and direction.

In one embodiment, based on the key point map 188, the vehicle processor 160 may alter a speed and/or trajectory of the vehicle 190 in order to avoid a collision or a near miss with the object 112. For example, the vehicle processor 160 may display or present audibly a request to a driver of the vehicle 104 to slow the vehicle 104 to a specified speed, come to a stop for an amount of time, and/or change a direction of the vehicle 104 to avoid a path of the object 112.

In one embodiment, the vehicle processor 160 may broadcast a notification to the first further vehicle processor 170 of the altered vehicle speed and trajectory 190. In response to receiving the notification, the first further vehicle processor 170 may not need to continue to obtain and transmit the third data 128, 178 to the vehicle processor 160 and/or the second vehicle processor 180, respectively. In one embodiment, the first further vehicle processor 170 may broadcast a notification to the second further vehicle processor 180 indicating the vehicle 104 and the object 112 are no longer in danger of intersecting. In response, the second further vehicle processor 180 may cancel a planned change to a route and trajectory based on the third data 182.

In one embodiment, receiving the third data 128 from the sensor on the further vehicle 108 may include determining, by the further vehicle 108, that the vehicle 104 is moving in reverse, detecting, by the sensor of the further vehicle 108, an object in motion 112, where a trajectory of the object 112 potentially intersects a predicted movement of the vehicle 104, and notifying the vehicle processor 160 of the detecting. In one embodiment, the further vehicle 108 may be prompted to obtain forward sensor data and send it to the vehicle 104 when the further vehicle 108 detects the vehicle 104 backing up and potentially intersecting with a moving object 112.

In one embodiment, a Radar/Lidar sensor of the further vehicle 108 may detect the vehicle 104 backing up. The Radar/Lidar sensor data may include a number of distance and direction data items at time intervals. The first further vehicle processor 170 may broadcast the third data 128, 178 to one or more proximate vehicles, including the vehicle 104, the object 112, and one or more other further vehicles 108. The vehicle processor 160 may determine a predicted movement of the vehicle 104 and a trajectory of the object 112 based on the first data, the second data, and the third data, as described herein.

In one embodiment, responsive to the third data 128 including a moving object 112 not present in the first data or the second data 156, the current solution may include determining the interworking may predict a collision between the vehicle 104 while moving in reverse and the moving object 112, determining an insufficient time exists to prevent the collision between the vehicle 104 while moving in reverse and the moving object 112, and notifying the vehicle 104 to stop. In one embodiment, the vehicle processor 160 may stop the vehicle 104 in lieu of notifying the vehicle 104 to stop if insufficient time exists for a driver to respond to the notificiation. In one embodiment, the third data 128 from the further vehicle 108 may detect a moving object 112 on a collision course with the reversing vehicle 104. For example, depending on speed/direction of the vehicle 104, speed/direction of the object 112, and how far apart they are, the graphical display and recognition by the vehicle driver may be too slow to prevent an accident. Therefore, the vehicle processor 160 may take over and bring the vehicle 104 to a stop, at least until the object 112 has passed and is out of a collision danger.

In one embodiment, the vehicle processor 160 may receive key points 186 from the vehicle 104 and the third data 128 and construct a key point map 188, as discussed herein. For example, the vehicle processor 160 may assign vectors to each moving entity in the key point map 188, where each vector includes a current position, a speed, and a direction. From the vectors, the vehicle processor 160 may determine a time when the vehicle 104 either intersects the moving object 112 or moves close enough to the moving object 112 to cause evasive maneuvers by either the vehicle 104 and/or the moving object 112 to avoid a collision. The evasive maneuvers may possibly cause an accident with further entities, such as the sensor obstruction 116 or the first or second further vehicles 108.

In one embodiment, the vehicle processor 160 may determine there is insufficient time for a driver of the vehicle 104 to react to the key point map 188 after it is displayed on a vehicle display or occupant device display. For example, there may be a parameter stored in an accessible memory device that requires at least 3 seconds from the time the key point map 188 is displayed until an expected intersection between the vehicle 104 and the moving object 112. For example, if the vehicle processor 160 determines there is less than the designated time until an expected intersection or collision, the vehicle processor 160 may bring the vehicle 104 to a stop until the moving object 112 has passed by the vehicle 104. For example, the vehicle processor 160 may send a message to a processor associated with the braking system of the vehicle 104.

In one embodiment, the current solution may include determining an expected direction of travel for the vehicle 104 in a roadway the vehicle 104 is reversing into, determining a distance the vehicle 104 needs to reverse, based on the expected direction and the first data, the second data, and the third data, and determining the vehicle 104 can safely reverse into the roadway at a speed the vehicle 104 is reversing, based on the distance. In one embodiment, the distance to stopping, then starting from reversing may be critical to the vehicle 104 safely reversing into a roadway. For example, the vehicle 104 may need to reverse a greater distance through one or more lanes to be facing the proper direction on the roadway.

In one embodiment, the vehicle processor 160 may obtain an expected direction of travel on the roadway from a navigation processor of the vehicle 104. For example, the navigation processor may have calculated a travel route to a destination that includes moving along the roadway in the expected direction. The vehicle processor 160 may determine a distance the vehicle 104 needs to reverse based on the roadway. For example, a roadway may have a pair of lanes allowing travel in opposite directions. A near lane may allow traffic to the right of the vehicle 104, and a far lane may allow traffic to the left of the vehicle 104. First data and second data from rear-oriented sensors may include a distance to a nearby curb and a distance to a far curb on the roadway. If the expected direction of travel is to the left, the vehicle processor 160 may subtract a stored distance between the far curb and the center of the far lane of the roadway (e.g., 8 feet) from the first and second data distance to the far curb (e.g., 45 feet), for a distance the vehicle 104 needs to reverse of 45−8=37 feet.

In one embodiment, the vehicle processor 160 may determine a speed the vehicle 104 is reversing (e.g., 5 miles per hour) from an ECU processor, and determine it will take 7.3 seconds to travel the required 37 feet. From the first data, the second data, and third data the vehicle processor 160 may determine a first further vehicle 108 is expected to pass the driveway in 5 seconds and a second further vehicle 108 is expected to pass the driveway in 15 seconds. The vehicle processor 160 may store in an accessible memory device an amount of time the current driver of the vehicle 104 has historically required to stop from reverse, shift the vehicle 104 to forward movement, and begin moving in a forward direction. The amount of time may include an average of transitions from reverse to forward for the current driver, and may include a number of recent occurrences. The vehicle processor 160 may determine the amount of time (plus an acceptable safety margin of 2-3 seconds, for example) is less than an expected approach time for the further vehicle 108 that is currently 15 seconds away. The vehicle processor 160 may maintain reversing the vehicle 104 to the far lane in preparation for the vehicle 104 coming to a stop, shifting to forward movement, and accelerating along the roadway in a leftward direction.

In one embodiment, the current solution may include determining a gap between the vehicle 104 and one or more further vehicles 108 exist for a time period, determining the vehicle 104 is moving in reverse at a lower speed to enter the gap safely within the time period, and notifying the vehicle 104 to increase speed while moving in reverse. Sometimes, while backing into a busy roadway, a gap may only be available for a limited number of seconds, for example. The vehicle processor 160 may determine the vehicle 104 is backing too slowly to enter the gap in traffic within the required number of seconds. The vehicle processor 160 may, for example, request the driver to increase speed while backing in order to enter the gap within the allotted time. Once stopped in the gap, the vehicle 104 may proceed in a forward direction and drive to the speed of traffic.

In one embodiment, the gap may be determined by the vehicle processor 160 by reviewing the first data, the second data, and the third data. Because the gap may be based on moving further vehicles 108, the location and size of the gap may dynamically change in time. The vehicle processor 160 may determine from the first data, the second data, and third data that the vehicle 104 will reach the roadway in a time period where the gap is too small to safely enter. For example, at the speeds further vehicles 108 are traveling, a safe gap may be limited to at least 8 seconds from the time the vehicle 104 reverses to the roadway. The vehicle processor 160 may also determine the vehicle 104 will reach the roadway in 5 seconds at the current speed the vehicle 104 is reversing. However, reviewing the third data 128, the vehicle processor 160 may determine that in 5 seconds, the gap will only be 6 seconds in the roadway, but if the vehicle 104 reaches the roadway in 4 seconds the gap will be 8.5 seconds. Therefore, the vehicle processor 160 may display and/or present audibly a request to accelerate the vehicle 104 in reverse from 3 to 5 miles per hour in order to reverse to the roadway in 4 seconds. The vehicle 104 safely reverses into the roadway and accelerates in the desired direction of travel within the 8 second gap.

In one embodiment, the current solution may include obtaining, by the further vehicle 108, an identification of the vehicle 104 in response to the vehicle 104 moving in reverse, determining a potential collision between the vehicle 104 and a moving object 112, and notifying the vehicle 104, based on the determination, of the potential collision. In one embodiment, it may be important for the further vehicle 108 to only notify the reversing vehicle 104 of a potential collision with the moving object 112. Further vehicles 108 should not be notified, for safety reasons. For example, a broadcast notification may be displayed and/or audibly presented to drivers in all further vehicles 108 proximate the vehicle 104 (i.e., within a wireless communication broadcast range).

Instead of broadcasting the third data 128 to the vehicle 104, the further vehicle 108 may read a rear license plate of the reversing vehicle 104, send the license plate number to a server, and receive contact information (Wi-Fi/Bluetooth, IP Address, etc.) in response. The server may be associated with a local department of motor vehicles, an insurance company, a same company who owns the vehicle 104 and the further vehicle 108, a city or municipality, and the like. By directing the notification warning of an impending collision only to the vehicle 104 and further vehicles 108 that may be affected by it, drivers that do not need to worry about the impending collision are not alerted or distracted, which may improve safety.

Although FIG. 1B illustrates the perspective of the vehicle processor 160 determining the vehicle speed and trajectory 158, determining the object position, speed and trajectory 184, determining and matching key points 186, and adding matched key points to a map 188, it should be understood that the various analysis steps may be performed by one or more other vehicle processors 170, 180. For example, because the vehicle 104 may have insufficient first and second data to detect the moving object 112, processors of further vehicles 108 may be better suited to perform the required calculations and avert a possible collision between the vehicle 104 and the moving object 112.

Flow diagrams depicted herein, such as FIG. 1A, FIG. 1B, FIG. 2C, FIG. 2D, FIG. 2E, FIG. 3A, FIG. 3B and FIG. 3C, are separate examples but may be the same or different embodiments. Any of the operations in one flow diagram could be adopted and shared with another flow diagram. No example operation is intended to limit the subject matter of any embodiment or corresponding claim.

It is important to note that all the flow diagrams and corresponding processes derived from FIG. 1A, FIG. 1B, FIG. 2C, FIG. 2D, FIG. 2E, FIG. 3A, FIG. 3B and FIG. 3C may be part of a same process or may share sub-processes with one another, thus making the diagrams combinable into a single preferred embodiment that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
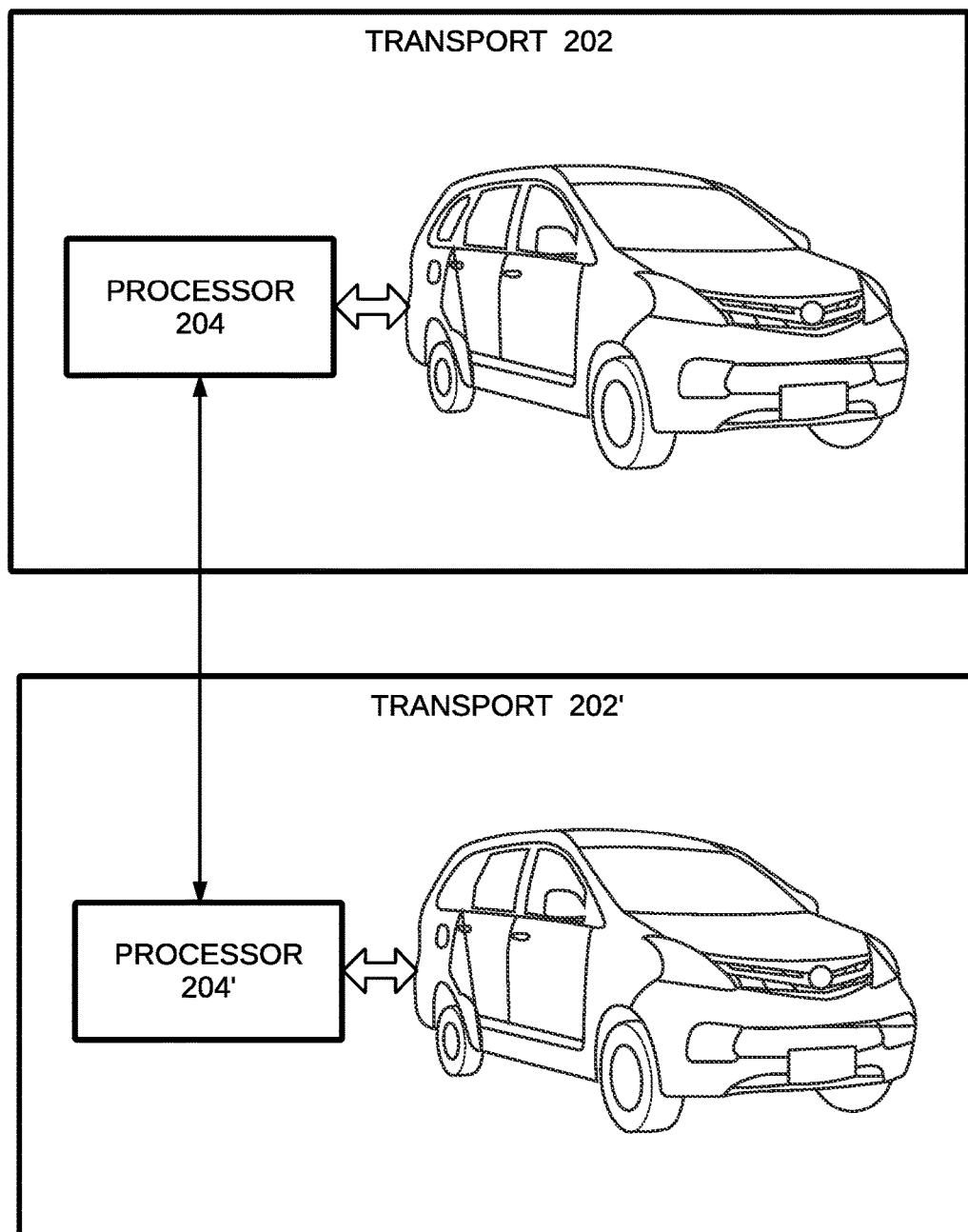
FIG. 2A illustrates a transport network diagram, according to example embodiments.

FIG. 2A illustrates a transport network diagram 200, according to example embodiments. The network comprises elements including a transport 202 including a processor 204, as well as a transport 202' including a processor 204'. The transports 202, 202' communicate with one another via the processors 204, 204', as well as other elements (not shown) including transceivers, transmitters, receivers, storage, sensors, and other elements capable of providing communication. The communication between the transports 202, and 202' can occur directly, via a private and/or a public network (not shown), or via other transports and elements comprising one or more of a processor, memory, and software. Although depicted as single transports and processors, a plurality of transports and processors may be present. One or more of the applications, features, steps, solutions, etc., described and/or depicted herein may be utilized and/or provided by the instant elements.

Figure 2B:
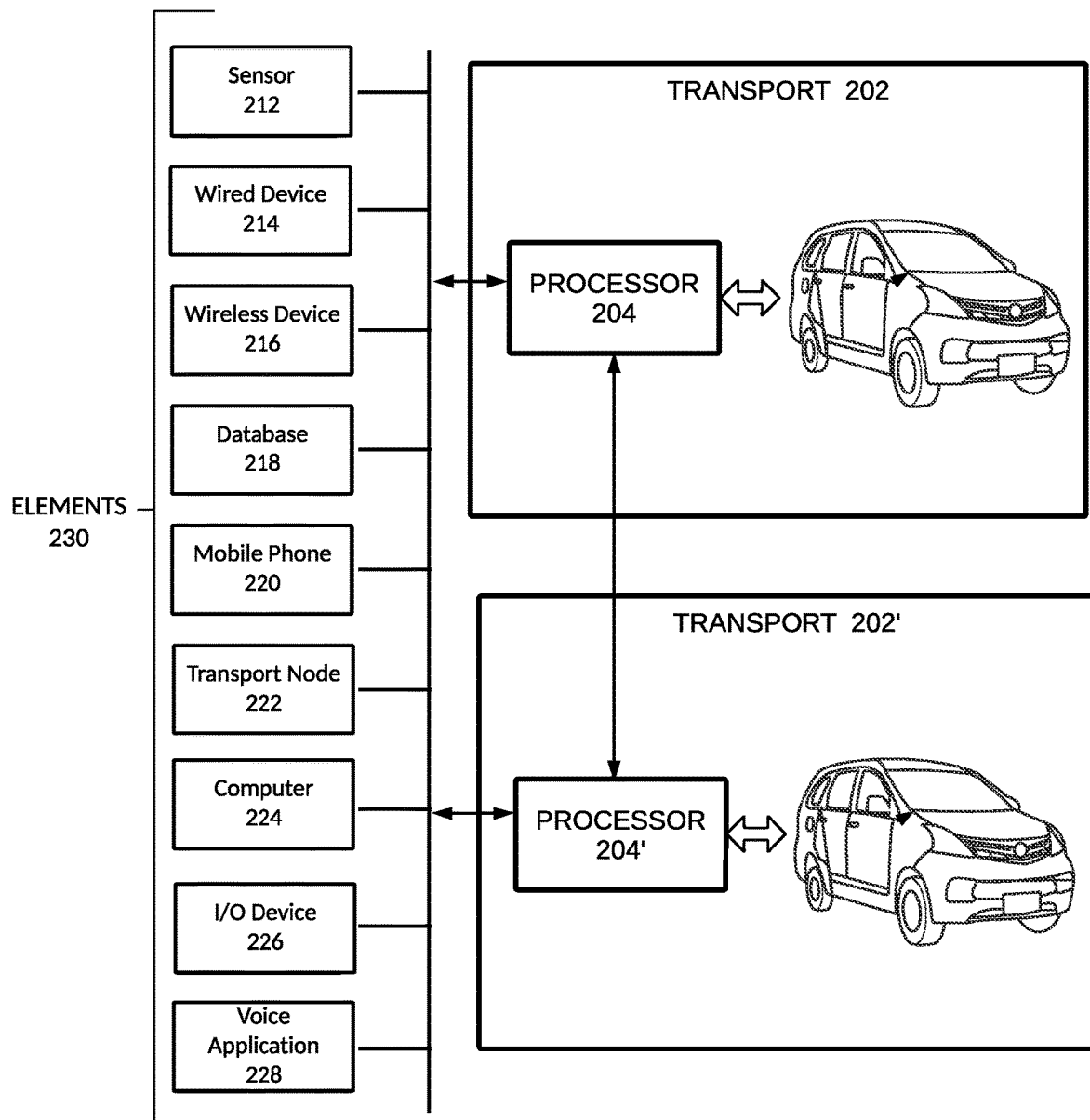
FIG. 2B illustrates another transport network diagram, according to example embodiments.

FIG. 2B illustrates another transport network diagram 210, according to example embodiments. The network comprises elements including a transport 202 including a processor 204, as well as a transport 202' including a processor 204'. The transports 202, 202' communicate with one another via the processors 204, 204', as well as other elements (not shown), including transceivers, transmitters, receivers, storage, sensors, and other elements capable of providing communication. The communication between the transports 202, and 202' can occur directly, via a private and/or a public network (not shown), or via other transports and elements comprising one or more of a processor, memory, and software. The processors 204, 204' can further communicate with one or more elements 230 including sensor 212, wired device 214, wireless device 216, database 218, mobile phone 220, transport 222, computer 224, I/O device 226, and voice application 228. The processors 204, 204' can further communicate with elements comprising one or more of a processor, memory, and software.

Although depicted as single transports, processors and elements, a plurality of transports, processors and elements may be present. Information or communication can occur to and/or from any of the processors 204, 204' and elements 230. For example, the mobile phone 220 may provide information to the processor 204, which may initiate the transport 202 to take an action, may further provide the information or additional information to the processor 204', which may initiate the transport 202' to take an action, may further provide the information or additional information to the mobile phone 220, the transport 222, and/or the computer 224. One or more of the applications, features, steps, solutions, etc., described and/or depicted herein may be utilized and/or provided by the instant elements.

Figure 2C:
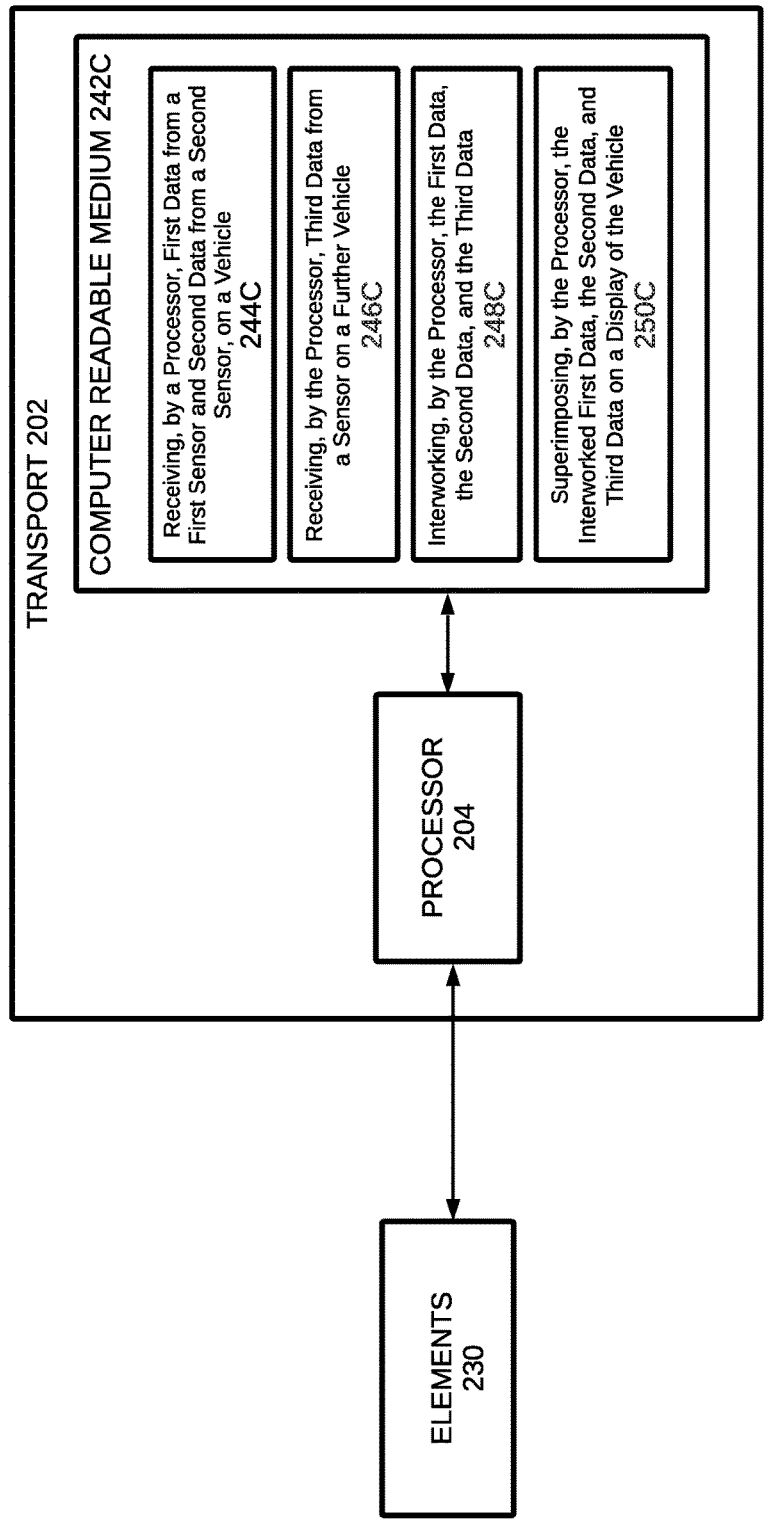
FIG. 2C illustrates yet another transport network diagram, according to example embodiments.

FIG. 2C illustrates yet another transport network diagram 240, according to example embodiments. The network comprises elements including a transport 202, a processor 204, and a non-transitory computer readable medium 242C. The processor 204 is communicably coupled to the computer readable medium 242C and elements 230 (which were depicted in FIG. 2B). The transport 202 could be a transport, server, or any device with a processor and memory.

The processor 204 performs one or more of receiving first data from a first sensor and second data from a second sensor, on a vehicle 244C, receiving third data from a sensor on a further vehicle, where the third data is not observable by the first sensor 246C, interworking the first data, the second data, and the third data 248C, and superimposing the interworked first data, the second data, and third data on a display of the vehicle 250C.

Figure 2D:
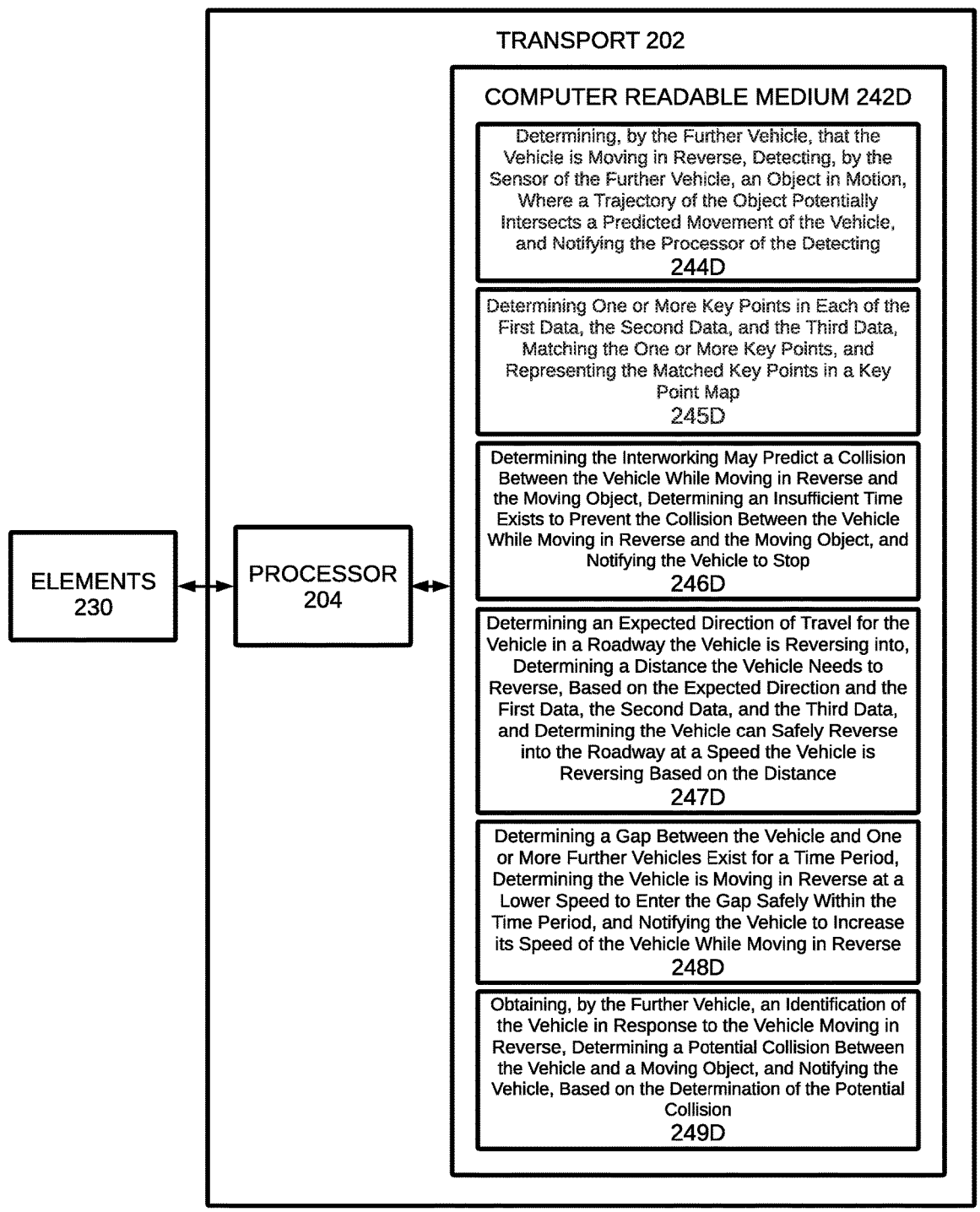
FIG. 2D illustrates a further transport network diagram, according to example embodiments.

FIG. 2D illustrates a further transport network diagram 250, according to example embodiments. The network comprises elements including a transport 202 a processor 204, and a non-transitory computer readable medium 242D. The processor 204 is communicably coupled to the computer readable medium 242D and elements 230 (which were depicted in FIG. 2B). The transport 202 could be a transport, server or any device with a processor and memory.

The processor 204 performs one or more of determining, by the further vehicle, that the vehicle is moving in reverse, detecting, by the sensor of the further vehicle, an object in motion, where a trajectory of the object potentially intersects a predicted movement of the vehicle, and notifying the processor of the detecting 244D, determining one or more key points in each of the first data, the second data, and the third data, matching the one or more key points, and representing the matched key points in a key point map 245D, determining the interworking may predict a collision between the vehicle while moving in reverse and the moving object, determining an insufficient time exists to prevent the collision between the vehicle while moving in reverse and the moving object, and notifying the vehicle to stop 246D, determining an expected direction of travel for the vehicle in a roadway the vehicle is reversing into, determining a distance the vehicle needs to reverse, based on the expected direction and the first data, the second data, and the third data, and determining the vehicle can safely reverse into the roadway at a speed the vehicle is reversing based on the distance 247D, determining a gap between the vehicle and one or more further vehicles exist for a time period, determining the vehicle is moving in reverse at a lower speed to enter the gap safely within the time period, and notifying the vehicle to increase its speed of the vehicle while moving in reverse 248D, and obtaining, by the further vehicle, an identification of the vehicle in response to the vehicle moving in reverse, determining a potential collision between the vehicle and a moving object, and notifying the vehicle, based on the determination of the potential collision 249D.

Figure 2E:
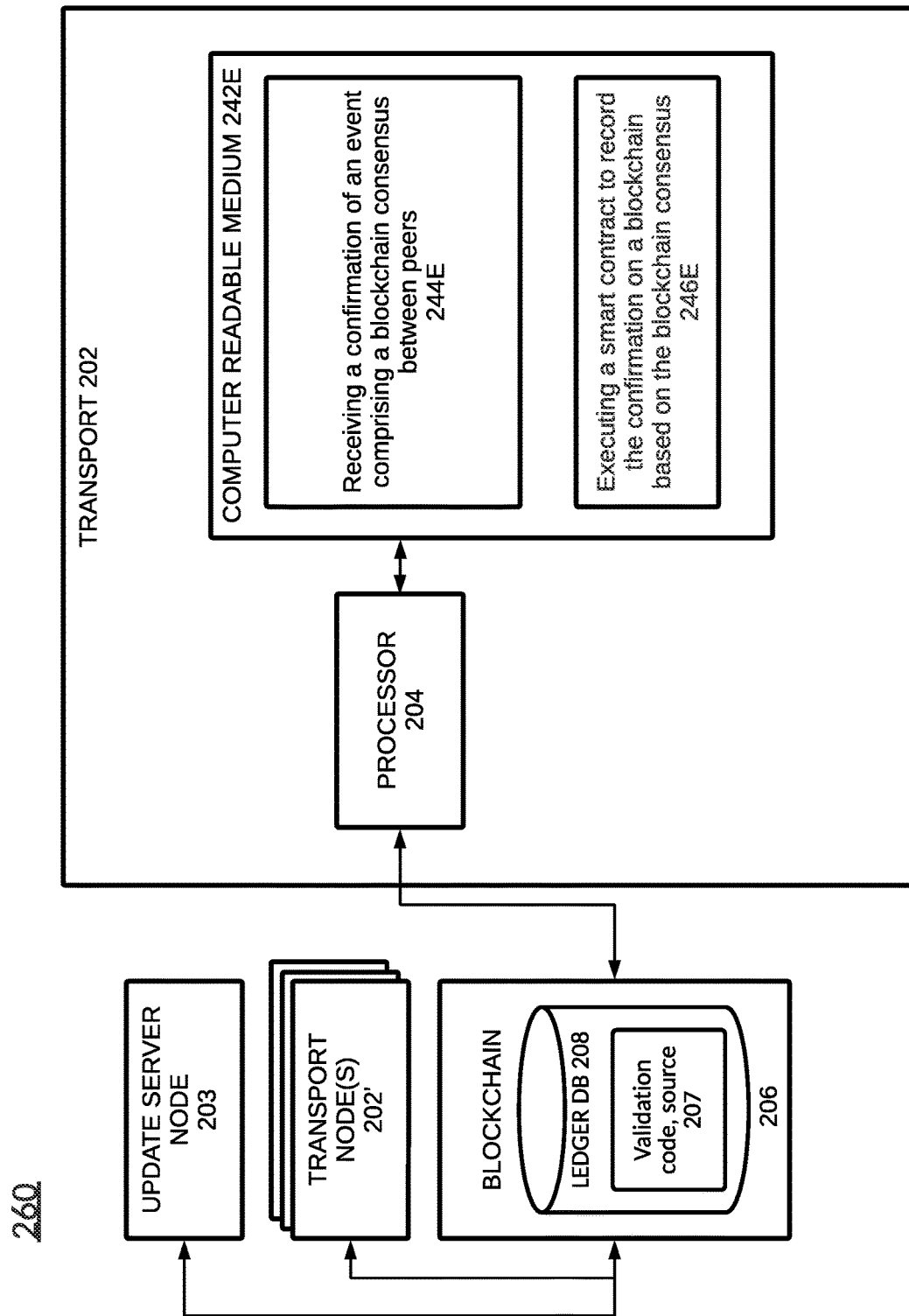
FIG. 2E illustrates yet a further transport network diagram, according to example embodiments.

FIG. 2E illustrates yet a further transport network diagram 260, according to example embodiments. Referring to FIG. 2E, the network diagram 260 includes a transport 202 connected to other transports 202' and to an update server node 203 over a blockchain network 206. The transports 202 and 202' may represent transports/vehicles. The blockchain network 206 may have a ledger 208 for storing software update validation data and a source 207 of the validation for future use (e.g., for an audit).

While this example describes in detail only one transport 202, multiple such nodes may be connected to the blockchain 206. It should be understood that the transport 202 may include additional components and that some of the components described herein may be removed and/or modified without departing from a scope of the instant application. The transport 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, it should be understood that the transport 202 may include multiple processors, multiple cores, or the like without departing from the scope of the instant application. The transport 202 could be a transport, server or any device with a processor and memory.

The processor 204 performs one or more of receiving a confirmation of an event from one or more elements described or depicted herein, wherein the confirmation comprises a blockchain consensus between peers represented by any of the elements 244E and executing a smart contract to record the confirmation on a blockchain-based on the blockchain consensus 246E. Consensus is formed between one or more of any element 230 and/or any element described or depicted herein, including a transport, a server, a wireless device, etc. In another example, the transport 202 can be one or more of any element 230 and/or any element described or depicted herein, including a server, a wireless device, etc.

The processors and/or computer readable medium 242E may fully or partially reside in the interior or exterior of the transports. The steps or features stored in the computer readable medium 242E may be fully or partially performed by any of the processors and/or elements in any order. Additionally, one or more steps or features may be added, omitted, combined, performed at a later time, etc.

Figure 2F:
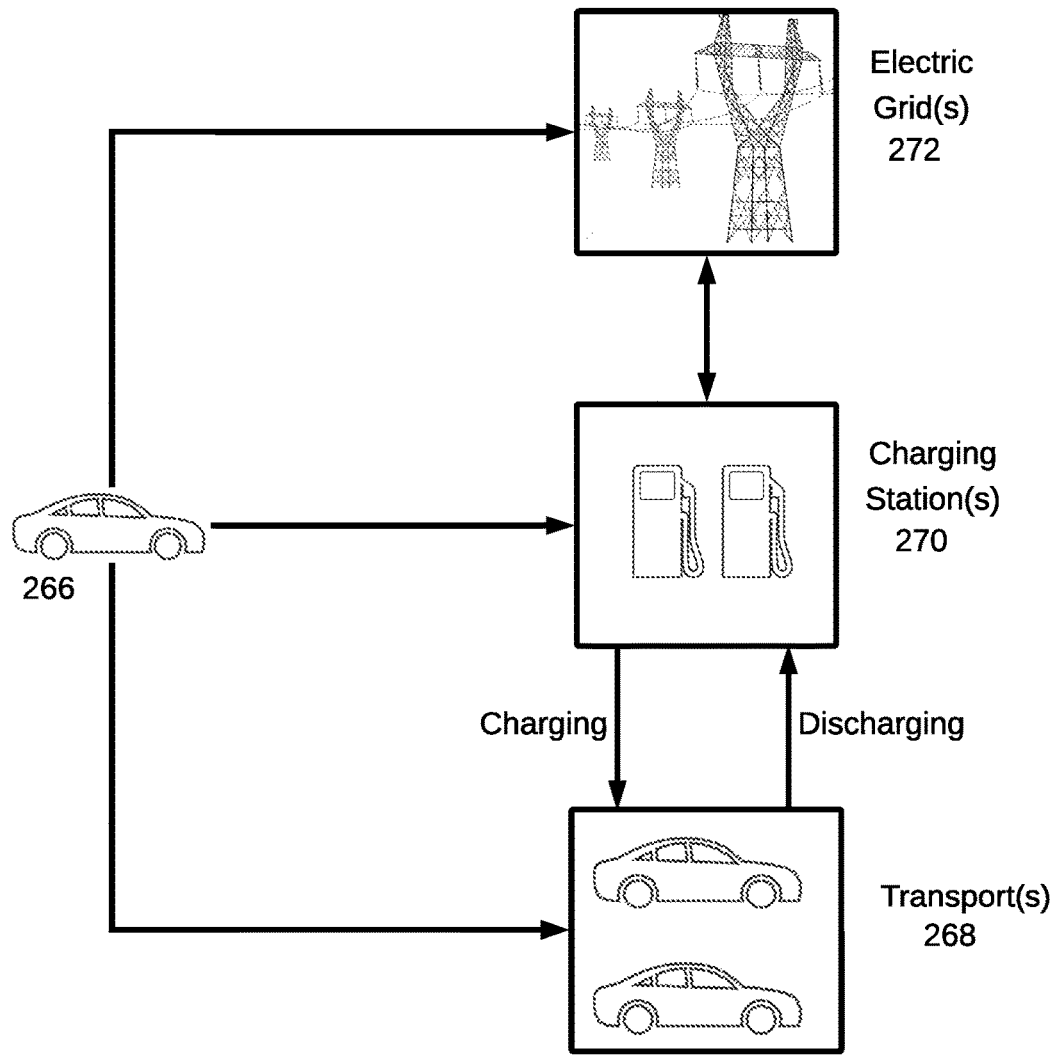
FIG. 2F illustrates a diagram depicting electrification of one or more elements, according to example embodiments.

FIG. 2F illustrates a diagram 265 depicting the electrification of one or more elements. In one example, a transport 266 may provide power stored in its batteries to one or more elements, including other transport(s) 268, charging station(s) 270, and electric grid(s) 272. The electric grid(s) 272 is/are coupled to one or more of the charging stations 270, which may be coupled to one or more of the transports 268. This configuration allows the distribution of electricity/ power received from the transport 266. The transport 266 may also interact with the other transport(s) 268, such as via Vehicle to Vehicle (V2V) technology, communication over cellular, WiFi, and the like. The transport 266 may also interact wirelessly and/or wired with other transports 268, the charging station(s) 270 and/or with the electric grid(s) 272. In one example, the transport 266 is routed (or routes itself) in a safe and efficient manner to the electric grid(s) 272, the charging station(s) 270, or the other transport(s) 268. Using one or more embodiments of the instant solution, the transport 266 can provide energy to one or more of the elements depicted herein in various advantageous ways as described and/or depicted herein. Further, the safety and efficiency of the transport may be increased, and the environment may be positively affected as described and/or depicted herein.

The term 'energy', 'electricity', 'power', and the like may be used to denote any form of energy received, stored, used, shared, and/or lost by the vehicles(s). The energy may be referred to in conjunction with a voltage source and/or a current supply of charge provided from an entity to the transport(s) during a charge/use operation. Energy may also be in the form of fossil fuels (for example, for use with a hybrid transport) or via alternative power sources, including but not limited to lithium-based, nickel-based, hydrogen fuel cells, atomic/nuclear energy, fusion-based energy sources, and energy generated on-the-fly during an energy sharing and/or usage operation for increasing or decreasing one or more transports energy levels at a given time.

In one example, the charging station 270 manages the amount of energy transferred from the transport 266 such that there is sufficient charge remaining in the transport 266 to arrive at a destination. In one example, a wireless connection is used to wirelessly direct an amount of energy transfer between transports 268, wherein the transports may both be in motion. In one embodiment, wireless charging may occur via a fixed charger and batteries of the transport in alignment with one another (such as a charging mat in a garage or parking space). In one example, an idle vehicle, such as a vehicle 266 (which may be autonomous) is directed to provide an amount of energy to a charging station 270 and return to the original location (for example, its original location or a different destination). In one example, a mobile energy storage unit (not shown) is used to collect surplus energy from at least one other transport 268 and transfer the stored surplus energy at a charging station 270. In one example, factors determine an amount of energy to transfer to a charging station 270, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one example, the transport(s) 268, the charging station(s) 270 and/or the electric grid(s) 272 can provide energy to the transport 266.

In one embodiment, a location such as a building, a residence, or the like (not depicted), communicably coupled to one or more of the electric grid 272, the transport 266, and/or the charging station(s) 270. The rate of electric flow to one or more of the location, the transport 266, the other transport(s) 268 is modified, depending on external conditions, such as weather. For example, when the external temperature is extremely hot or extremely cold, raising the chance for an outage of electricity, the flow of electricity to a connected vehicle 266/268 is slowed to help minimize the chance for an outage.

In one embodiment, transports 266 and 268 may be utilized as bidirectional transports. Bidirectional transports are those that may serve as mobile microgrids that can assist in the supplying of electrical power to the grid 272 and/or reduce the power consumption when the grid is stressed. Bidirectional transports incorporate bidirectional charging, which in addition to receiving a charge to the transport, the transport can take energy from the transport and "push" the energy back into the grid 272, otherwise referred to as "V2G". In bidirectional charging, the electricity flows both ways; to the transport and from the transport. When a transport is charged, alternating current (AC) electricity from the grid 272 is converted to direct current (DC). This may be performed by one or more of the transport's own converter or a converter on the charger 270. The energy stored in the transport's batteries may be sent in an opposite direction back to the grid. The energy is converted from DC to AC through a converter usually located in the charger 270, otherwise referred to as a bidirectional charger. Further, the instant solution as described and depicted with respect to FIG. 2F can be utilized in this and other networks and/or systems.

Figure 2G:
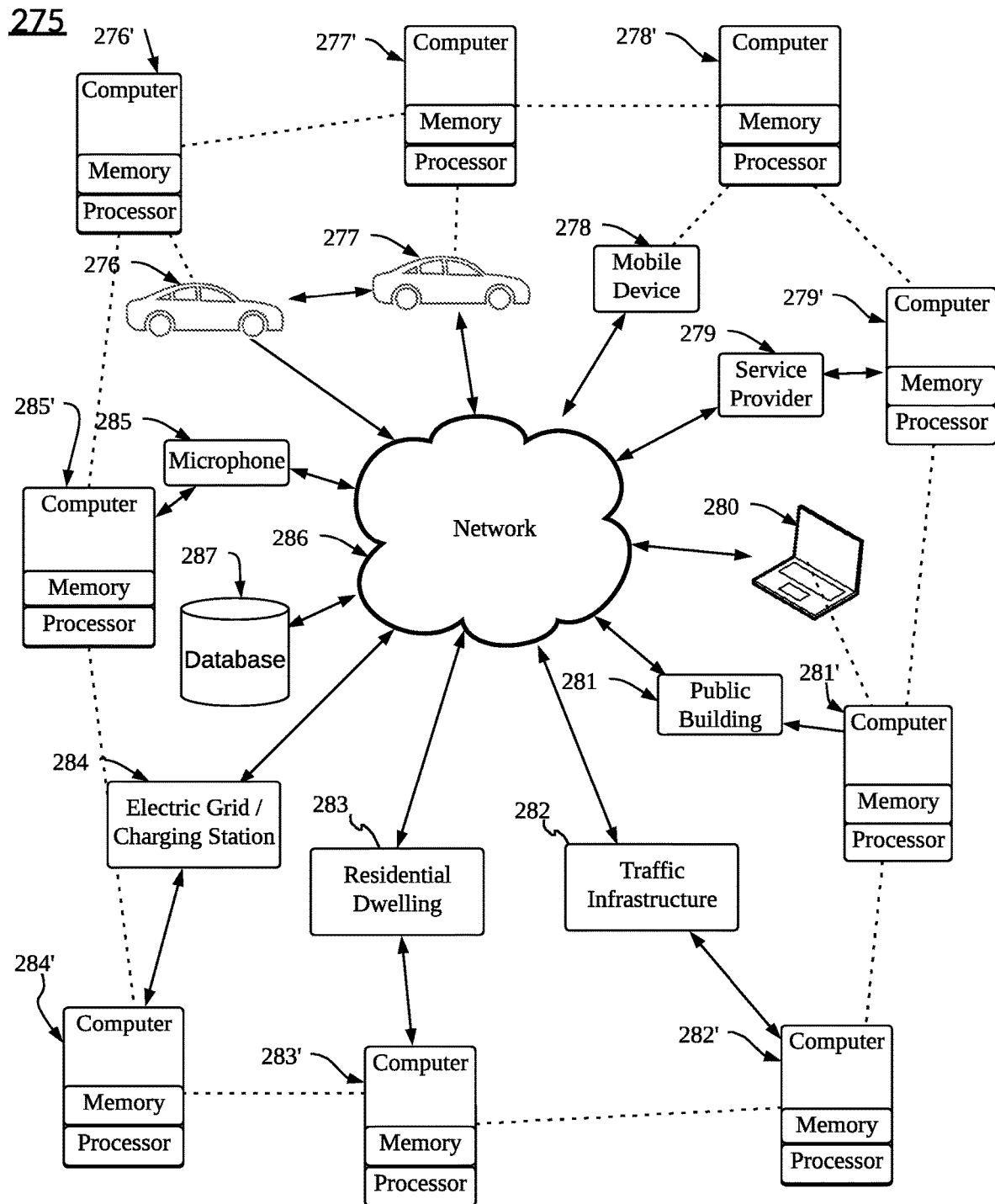
FIG. 2G illustrates a diagram depicting interconnections between different elements, according to example embodiments.

FIG. 2G is a diagram showing interconnections between different elements 275. The instant solution may be stored and/or executed entirely or partially on and/or by one or more computing devices 278', 279', 281', 282', 283', 284', 276', 285', 287' and 277' associated with various entities, all communicably coupled and in communication with a network 286. A database 287 is communicably coupled to the network and allows for the storage and retrieval of data. In one example, the database is an immutable ledger. One or more of the various entities may be a transport 276, one or more service provider 279, one or more public buildings 281, one or more traffic infrastructure 282, one or more residential dwellings 283, an electric grid/charging station 284, a microphone 285, and/or another transport 277. Other entities and/or devices, such as one or more private users using a smartphone 278, a laptop 280, an augmented reality (AR) device, a virtual reality (VR) device, and/or any wearable device may also interwork with the instant solution. The smartphone 278, laptop 280, the microphone 285, and other devices may be connected to one or more of the connected computing devices 278', 279', 281', 282', 283', 284', 276', 285', 287', and 277'. The one or more public buildings 281 may include various agencies. The one or more public buildings 281 may utilize a computing device 281'. The one or more service provider 279 may include a dealership, a tow truck service, a collision center or other repair shop. The one or more service provider 279 may utilize a computing apparatus 279'. These various computer devices may be directly and/or communicably coupled to one another, such as via wired networks, wireless networks, blockchain networks, and the like. The microphone 285 may be utilized as a virtual assistant, in one example. In one example, the one or more traffic infrastructure 282 may include one or more traffic signals, one or more sensors including one or more cameras, vehicle speed sensors or traffic sensors, and/or other traffic infrastructure. The one or more traffic infrastructure 282 may utilize a computing device 282'.

In one embodiment, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a transport 277/276 can transport a person, an object, a permanently or temporarily affixed apparatus, and the like. In one example, the transport 277 may communicate with transport 276 via V2V communication through the computers associated with each transport 276' and 277' and may be referred to as a transport, car, vehicle, automobile, and the like. The transport 276/277 may be a self-propelled wheeled conveyance, such as a car, a sports utility vehicle, a truck, a bus, a van, or other motor or battery-driven or fuel cell-driven transport. For example, transport 276/277 may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The transport 276/277 may be semi-autonomous or autonomous. For example, transport 276/277 may be self-maneuvering and navigate without human input. An autonomous vehicle may have and use one or more sensors and/or a navigation unit to drive autonomously.

Figure 2H:
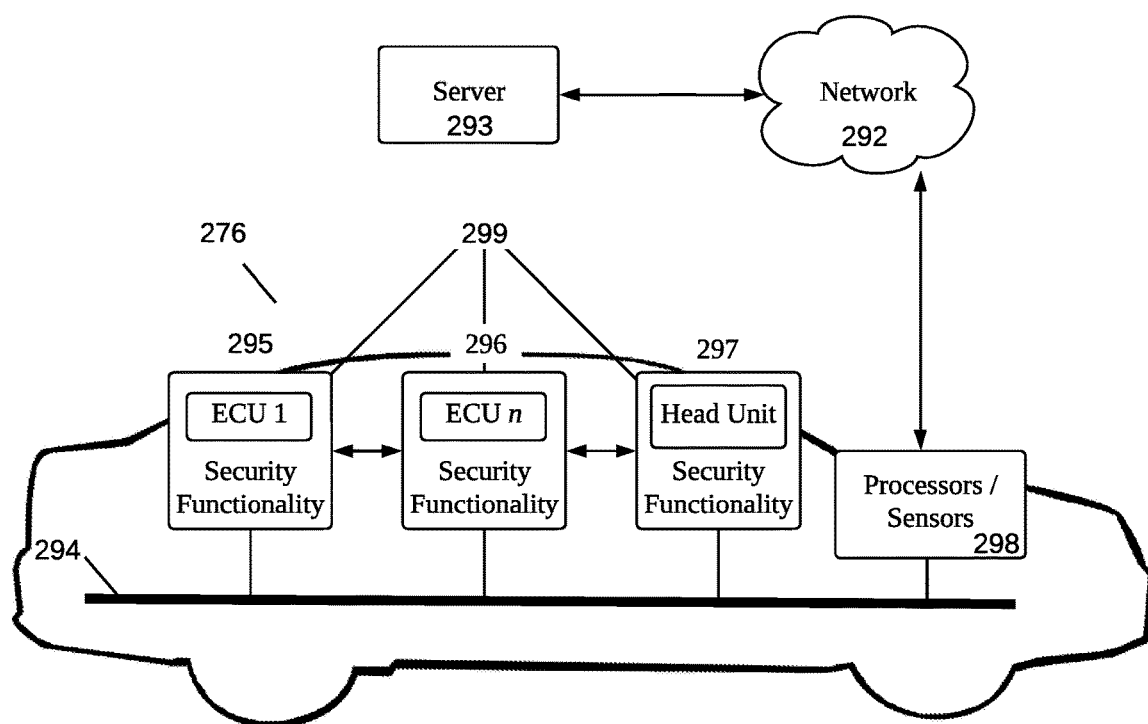
FIG. 2H illustrates a further diagram depicting interconnections between different elements, according to example embodiments.

FIG. 2H is another block diagram showing interconnections between different elements in one example 290. A transport 276 is presented and includes ECUs 295, 296, and a Head Unit (otherwise known as an Infotainment System) 297. An Electrical Control Unit (ECU) is an embedded system in automotive electronics controlling one or more of the electrical systems or subsystems in a transport. ECUs may include but are not limited to the management of a transport's engine, brake system, gearbox system, door locks, dashboard, airbag system, infotainment system, electronic differential, and active suspension. ECUs are connected to the transport's Controller Area Network (CAN) bus 294. The ECUs may also communicate with a transport computer 298 via the CAN bus 294. The transport's processors/sensors (such as the transport computer) 298 can communicate with external elements, such as a server 293 via a network 292 (such as the Internet). Each ECU 295, 296, and Head Unit 297 may contain its own security policy. The security policy defines permissible processes that can be executed in the proper context. In one example, the security policy may be partially or entirely provided in the transport computer 298.

ECUs 295, 296, and Head Unit 297 may each include a custom security functionality element 299 defining authorized processes and contexts within which those processes are permitted to run. Context-based authorization to determine validity if a process can be executed allows ECUs to maintain secure operation and prevent unauthorized access from elements such as the transport's Controller Area Network (CAN Bus). When an ECU encounters a process that is unauthorized, that ECU can block the process from operating. Automotive ECUs can use different contexts to determine whether a process is operating within its permitted bounds, such as proximity contexts such as nearby objects, distance to approaching objects, speed, and trajectory relative to other moving objects, and operational contexts such as an indication of whether the transport is moving or parked, the transport's current speed, the transmission state, user-related contexts such as devices connected to the transport via wireless protocols, use of the infotainment, cruise control, parking assist, driving assist, location-based contexts, and/or other contexts.

Figure 2I:
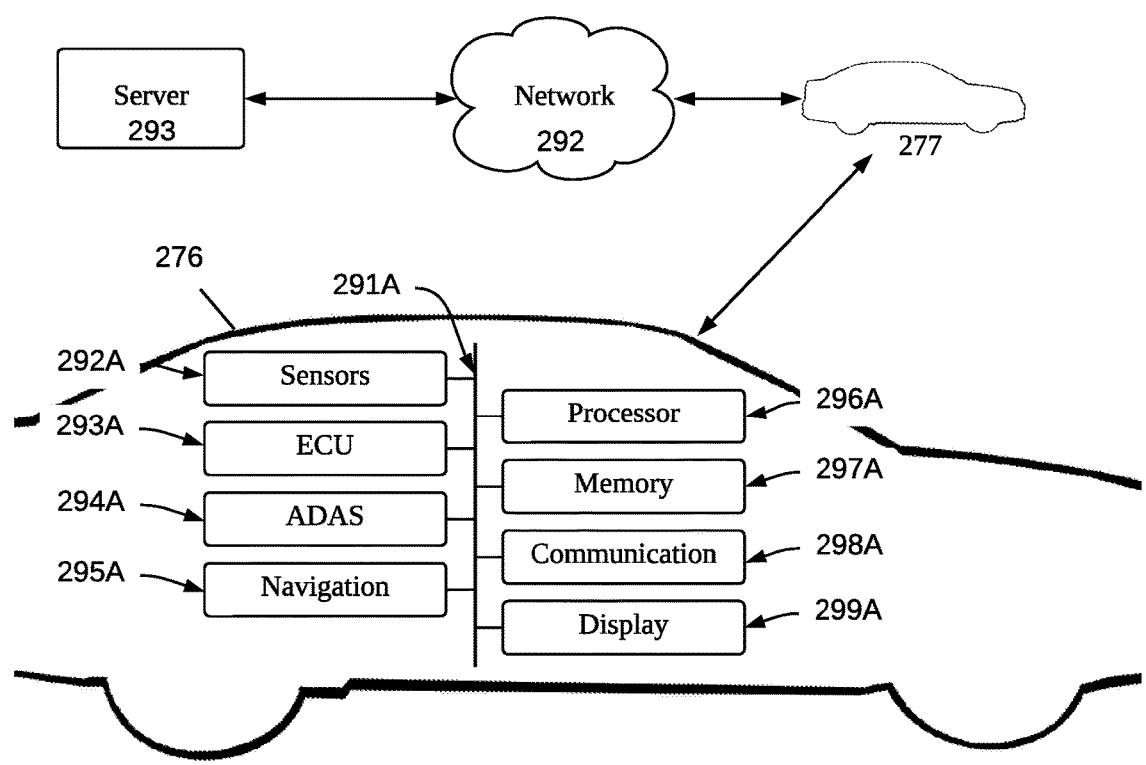
FIG. 2I illustrates yet a further diagram depicting interconnections between elements, according to example embodiments.

Referring to FIG. 2I, an operating environment 290A for a connected transport, is illustrated according to some embodiments. As depicted, the transport 276 includes a Controller Area Network (CAN) bus 291A connecting elements 292A-299A of the transport. Other elements may be connected to the CAN bus and are not depicted herein. The depicted elements connected to the CAN bus include a sensor set 292A, Electronic Control Units 293A, autonomous features or Advanced Driver Assistance Systems (ADAS) 294A, and the navigation system 295A. In some embodiments, the transport 276 includes a processor 296A, a memory 297A, a communication unit 298A, and an electronic display 299A.

The processor 296A includes an arithmetic logic unit, a microprocessor, a general-purpose controller, and/or a similar processor array to perform computations and provide electronic display signals to a display unit 299A. The processor 296A processes data signals and may include various computing architectures, including a complex instruction set computer (CISC) architecture, a reduced instruction set computer (RISC) architecture, or an architecture implementing a combination of instruction sets. The transport 276 may include one or more processors 296A. Other processors, operating systems, sensors, displays, and physical configurations that are communicably coupled to one another (not depicted) may be used with the instant solution.

Memory 297A is a non-transitory memory storing instructions or data that may be accessed and executed by the processor 296A. The instructions and/or data may include code to perform the techniques described herein. The memory 297A may be a dynamic random-access memory (DRAM) device, a static random-access memory (SRAM) device, flash memory, or another memory device. In some embodiments, the memory 297A also may include non-volatile memory or a similar permanent storage device and media, which may include a hard disk drive, a floppy disk drive, a CD-ROM device, a DVD-ROM device, a DVD-RAM device, a DVD-RW device, a flash memory device, or some other mass storage device for storing information on a permanent basis. A portion of the memory 297A may be reserved for use as a buffer or virtual random-access memory (virtual RAM). The transport 276 may include one or more memories 297A without deviating from the current solution.

The memory 297A of the transport 276 may store one or more of the following types of data: navigation route data 295A, and autonomous features data 294A. In some embodiments, the memory 297A stores data that may be necessary for the navigation application 295A to provide the functions.

The navigation system 295A may describe at least one navigation route including a start point and an endpoint. In some embodiments, the navigation system 295A of the transport 276 receives a request from a user for navigation routes wherein the request includes a starting point and an ending point. The navigation system 295A may query a real-time data server 293 (via a network 292), such as a server that provides driving directions, for navigation route data corresponding to navigation routes, including the start point and the endpoint. The real-time data server 293 transmits the navigation route data to the transport 276 via a wireless network 292, and the communication system 298A stores the navigation data 295A in the memory 297A of the transport 276.

The ECU 293A controls the operation of many of the systems of the transport 276, including the ADAS systems 294A. The ECU 293A may, responsive to instructions received from the navigation system 295A, deactivate any unsafe and/or unselected autonomous features for the duration of a journey controlled by the ADAS systems 294A. In this way, the navigation system 295A may control whether ADAS systems 294A are activated or enabled so that they may be activated for a given navigation route.

The sensor set 292A may include any sensors in the transport 276 generating sensor data. For example, the sensor set 292A may include short-range sensors and long-range sensors. In some embodiments, the sensor set 292A of the transport 276 may include one or more of the following vehicle sensors: a camera, a Lidar sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a GPS sensor, a mapping functionality, and any other type of automotive sensor. The navigation system 295A may store the sensor data in the memory 297A.

The communication unit 298A transmits and receives data to and from the network 292 or to another communication channel. In some embodiments, the communication unit 298A may include a DSRC transceiver, a DSRC receiver, and other hardware or software necessary to make the transport 276 a DSRC-equipped device.

The transport 276 may interact with other transports 277 via V2V technology. V2V communication includes sensing radar information corresponding to relative distances to external objects, receiving GPS information of the transports, setting areas as areas where the other transports 277 are located based on the sensed radar information, calculating probabilities that the GPS information of the object vehicles will be located at the set areas, and identifying transports and/or objects corresponding to the radar information and the GPS information of the object vehicles based on the calculated probabilities, in one example.

For a transport to be adequately secured, the transport must be protected from unauthorized physical access as well as unauthorized remote access (e.g., cyber-threats). To prevent unauthorized physical access, a transport is equipped with a secure access system such as a keyless entry in one example. Meanwhile, security protocols are added to a transport's computers and computer networks to facilitate secure remote communications to and from the transport in one example.

Electronic Control Units (ECUs) are nodes within a transport that control tasks such as activating the windshield wipers to tasks such as an anti-lock brake system. ECUs are often connected to one another through the transport's central network, which may be referred to as a controller area network (CAN). State-of-the-art features such as autonomous driving are strongly reliant on implementing new, complex ECUs such as advanced driver-assistance systems (ADAS), sensors, and the like. While these new technologies have helped improve the safety and driving experience of a transport, they have also increased the number of externally-communicating units inside of the transport, making them more vulnerable to attack. Below are some examples of protecting the transport from physical intrusion and remote intrusion.

Figure 2J:
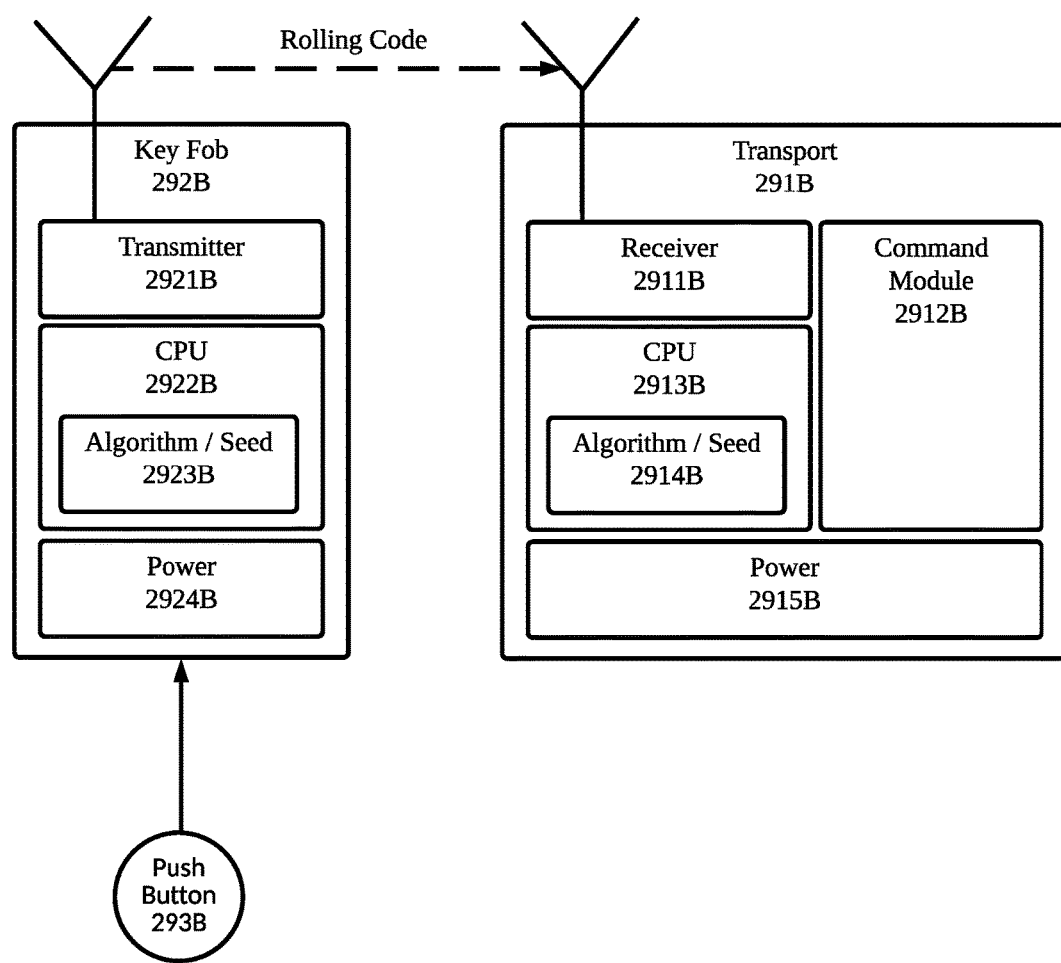
FIG. 2J illustrates yet a further diagram depicting a keyless entry system, according to example embodiments.

FIG. 2J illustrates a keyless entry system 290B to prevent unauthorized physical access to a transport 291B, according to example embodiments. Referring to FIG. 2J, a key fob 292B transmits commands to a transport 291B using radio frequency signals in one example. In this example, the key fob 292B includes a transmitter 2921B with an antenna that is capable of sending short-range wireless radio signals. The transport 291B includes a receiver 2911B with an antenna that is capable of receiving the short-range wireless signal transmitted from the transmitter 2921B. The key fob 292B and the transport 291B also include CPUs 2922B and 2913B, respectively, which control the respective devices. Here, a memory of the CPUs 2922B and 2913B (or accessible to the CPUs). Each of the key fob 292B and the transport 291B includes power supplies 2924B and 2915B for powering the respective devices in one example.

When the user presses a button 293B (or otherwise actuates the fob, etc.) on the key fob 292B, the CPU 2922B wakes up inside the key fob 292B and sends a data stream to the transmitter 2921B, which is output via the antenna. In other embodiments, the user's intent is acknowledged on the key fob 292B via other means, such as via a microphone that accepts audio, a camera that captures images and/or video, or other sensors that are commonly utilized in the art to detect intent from a user including receiving gestures, motion, eye movements, and the like. The data stream may be a 64-bit to 128-bit long signal, which includes one or more of a preamble, a command code, and a rolling code. The signal may be sent at a rate between 2 KHz and 20 KHz, but embodiments are not limited thereto. In response, the receiver 2911B of the transport 291B captures the signal from the transmitter 2921B, demodulates the signal, and sends the data stream to the CPU 2913B, which decodes the signal and sends commands (e.g., lock the door, unlock the door, etc.) to a command module 2912B.

If the key fob 292B and the transport 291B use a fixed code between them, replay attacks can be performed. In this case, if the attacker can capture/sniff the fixed code during the short-range communication, the attacker could replay this code to gain entry into the transport 291B. To improve security, the key fob and the transport 291B may use a rolling code that changes after each use. Here, the key fob 292B and the transport 291B are synchronized with an initial seed 2923B (e.g., a random number, pseudo-random number, etc.). This is referred to as pairing. The key fob 292B and the transport 291B also include a shared algorithm for modifying the initial seed 2914B each time the button 293B is pressed. The following keypress will take the result of the previous keypress as an input and transform it into the next number in the sequence. In some cases, the transport 291B may store multiple next codes (e.g., 255 next codes) in case the keypress on the key fob 292B is not detected by the transport 291B. Thus, a number of keypress on the key fob 292B that are unheard by the transport 291B do not prevent the transport from becoming out of sync.

In addition to rolling codes, the key fob 292B and the transport 291B may employ other methods to make attacks even more difficult. For example, different frequencies may be used for transmitting the rolling codes. As another example, two-way communication between the transmitter 2921B and the receiver 2911B may be used to establish a secure session. As another example, codes may have limited expirations or timeouts. Further, the instant solution as described and depicted with respect to FIG. 2J can be utilized in this and other networks and/or systems, including those that are described and depicted herein.

Figure 2K:
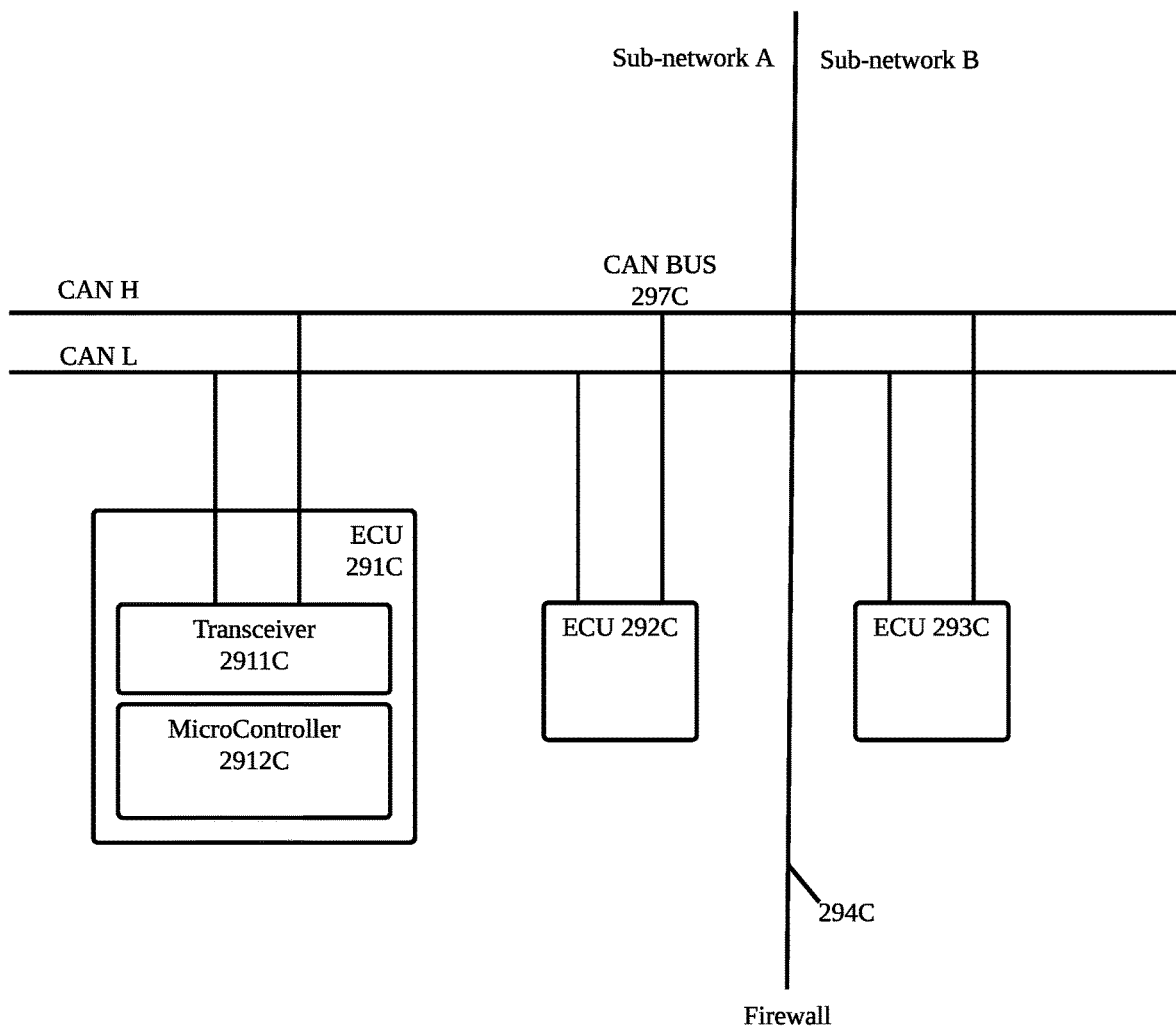
FIG. 2K illustrates yet a further diagram depicting a CAN within a transport, according to example embodiments.

FIG. 2K illustrates a controller area network (CAN) 290C within a transport, according to example embodiments. Referring to FIG. 2K, the CAN 290C includes a CAN bus 297C with a high and low terminal and a plurality of electronic control units (ECUs) 291C, 292C, 293C, etc. which are connected to the CAN bus 297C via wired connections. The CAN bus 297C is designed to allow microcontrollers and devices to communicate with each other in an application without a host computer. The CAN bus 297C implements a message-based protocol (i.e., ISO 11898 standards) that allows ECUs 291C-293C to send commands to one another at a root level. Meanwhile, the ECUs 291C-293C represent controllers for controlling electrical systems or subsystems within the transport. Examples of the electrical systems include power steering, anti-lock brakes, air-conditioning, tire pressure monitoring, cruise control, and many other features.

In this example, the ECU 291C includes a transceiver 2911C and a microcontroller 2912C. The transceiver may be used to transmit and receive messages to and from the CAN bus 297C. For example, the transceiver 2911C may convert the data from the microcontroller 2912C into a format of the CAN bus 297C and also convert data from the CAN bus 297C into a format for the microcontroller 2912C. Meanwhile, the microcontroller 2912C interprets the messages and also decide what messages to send using ECU software installed therein in one example.

To protect the CAN 290C from cyber threats, various security protocols may be implemented. For example, sub-networks (e.g., sub-networks A and B, etc.) may be used to divide the CAN 290C into smaller sub-CANs and limit an attacker's capabilities to access the transport remotely. In the example of FIG. 2K, ECUs 291C and 292C may be part of a same sub-network, while ECU 293C is part of an independent sub-network. Furthermore, a firewall 294C (or gateway, etc.) may be added to block messages from crossing the CAN bus 297C across sub-networks. If an attacker gains access to one sub-network, the attacker will not have access to the entire network. To make sub-networks even more secure, the most critical ECUs are not placed on the same sub-network, in one example.

Although not shown in FIG. 2K, other examples of security controls within a CAN include an intrusion detection system (IDS) which can be added to each sub-network and read all data passing to detect malicious messages. If a malicious message is detected, the IDS can notify the automobile user. Other possible security protocols include encryption/security keys that can be used to obscure messages. As another example, authentication protocols are implemented that enables a message to authenticate itself, in one example.

In addition to protecting a transport's internal network, transports may also be protected when communicating with external networks such as the Internet. One of the benefits of having a transport connection to a data source such as the Internet is that information from the transport can be sent through a network to remote locations for analysis. Examples of transport information include GPS, onboard diagnostics, tire pressure, and the like. These communication systems are often referred to as telematics because they involve the combination of telecommunications and informatics. Further, the instant solution as described and depicted with respect to FIG. 2K can be utilized in this and other networks and/or systems, including those that are described and depicted herein.

Figure 2L:
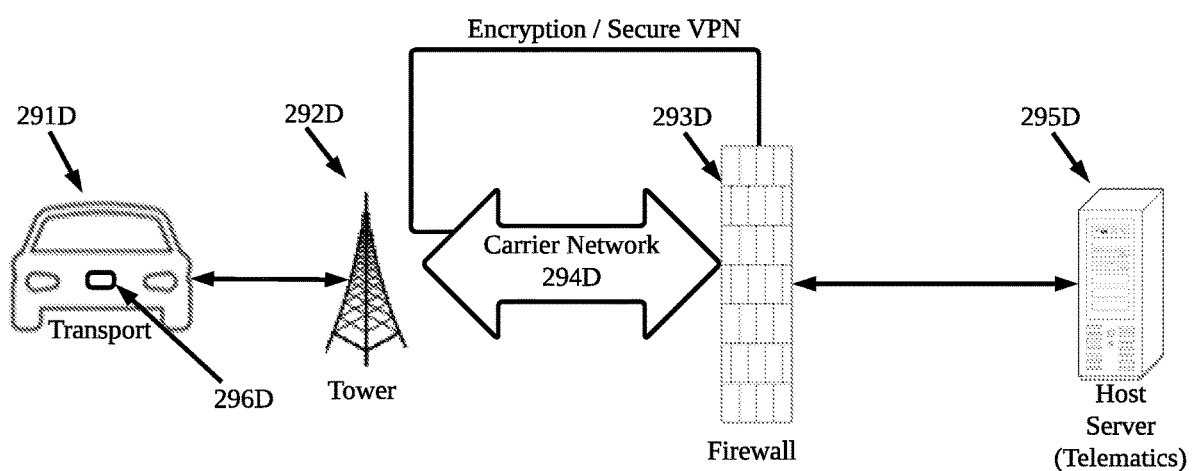
FIG. 2L illustrates yet a further diagram depicting an end-to-end communication channel, according to example embodiments.

FIG. 2L illustrates a secure end-to-end transport communication channel according to example embodiments. Referring to FIG. 2L, a telematics network 290D includes a transport 291D and a host server 295D that is disposed at a remote location (e.g., a web server, a cloud platform, a database, etc.) and connected to the transport 291D via a network such as the Internet. In this example, a device 296D associated with the host server 295D may be installed within the network inside the transport 291D. Furthermore, although not shown, the device 296D may connect to other elements of the transport 291D, such as the CAN bus, an onboard diagnostics (ODBII) port, a GPS system, a SIM card, a modem, and the like. The device 296D may collect data from any of these systems and transfer the data to the server 295D via the network.

Secure management of data begins with the transport 291D. In some embodiments, the device 296D may collect information before, during, and after a trip. The data may include GPS data, travel data, passenger information, diagnostic data, fuel data, speed data, and the like. However, the device 296D may only communicate the collected information back to the host server 295D in response to transport ignition and trip completion. Furthermore, communication may only be initiated by the device 296D and not by the host server 295D. As such, the device 296D will not accept communications initiated by outside sources in one example.

To perform the communication, the device 296D may establish a secured private network between the device 296D and the host server 295D. Here, the device 296D may include a tamper-proof SIM card that provides secure access to a carrier network 294D via a radio tower 292D. When preparing to transmit data to the host server 295D, the device 296D may establish a one-way secure connection with the host server 295D. The carrier network 294D may communicate with the host server 295D using one or more security protocols. As a non-limiting example, the carrier network 294D may communicate with the host server 295D via a VPN tunnel which allows access through a firewall 293D of the host server 295D. As another example, the carrier network 294D may use data encryption (e.g., AES encryption, etc.) when transmitting data to the host server 295D. In some cases, the system may use multiple security measures such as both a VPN and encryption to further secure the data.

In addition to communicating with external servers, transports may also communicate with each other. In particular, transport-to-transport (V2V) communication systems enable transports to communicate with each other, roadside infrastructures (e.g., traffic lights, signs, cameras, parking meters, etc.), and the like, over a wireless network. The wireless network may include one or more of Wi-Fi networks, cellular networks, dedicated short-range communication (DSRC) networks, and the like. Transports may use V2V communication to provide other transports with information about a transport's speed, acceleration, braking, and direction, to name a few. Accordingly, transports can receive insight into the conditions ahead before such conditions become visible, thus greatly reducing collisions. Further, the instant solution as described and depicted with respect to FIG. 2L can be utilized in this and other networks and/or systems, including those that are described and depicted herein.

Figure 2M:
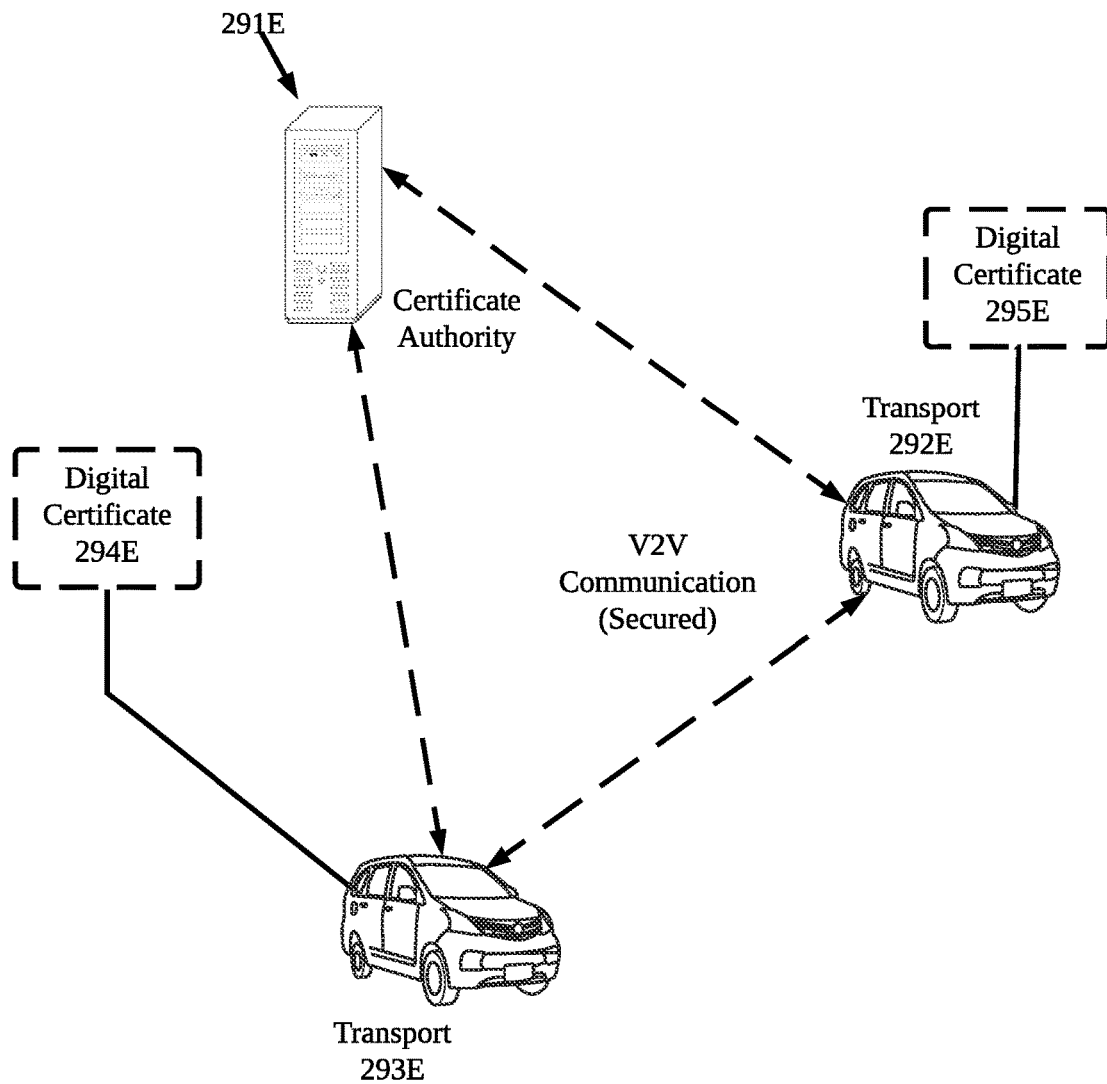
FIG. 2M illustrates yet a further diagram depicting an example of transports performing secured V2V communications using security certificates, according to example embodiments.

FIG. 2M illustrates an example 290E of transports 293E and 292E performing secured V2V communications using security certificates, according to example embodiments. Referring to FIG. 2M, the transports 293E and 292E may communicate via V2V communications over a short-range network, a cellular network, or the like. Before sending messages, the transports 293E and 292E may sign the messages using a respective public key certificate. For example, the transport 293E may sign a V2V message using a public key certificate 294E. Likewise, the transport 292E may sign a V2V message using a public key certificate 295E. The public key certificates 294E and 295E are associated with the transports 293E and 292E, respectively, in one example.

Upon receiving the communications from each other, the transports may verify the signatures with a certificate authority 291E or the like. For example, the transport 292E may verify with the certificate authority 291E that the public key certificate 294E used by transport 293E to sign a V2V communication is authentic. If the transport 292E successfully verifies the public key certificate 294E, the transport knows that the data is from a legitimate source. Likewise, the transport 293E may verify with the certificate authority 291E that the public key certificate 295E used by the transport 292E to sign a V2V communication is authentic. Further, the instant solution as described and depicted with respect to FIG. 2M can be utilized in this and other networks and/or systems including those that are described and depicted herein.

Figure 2N:
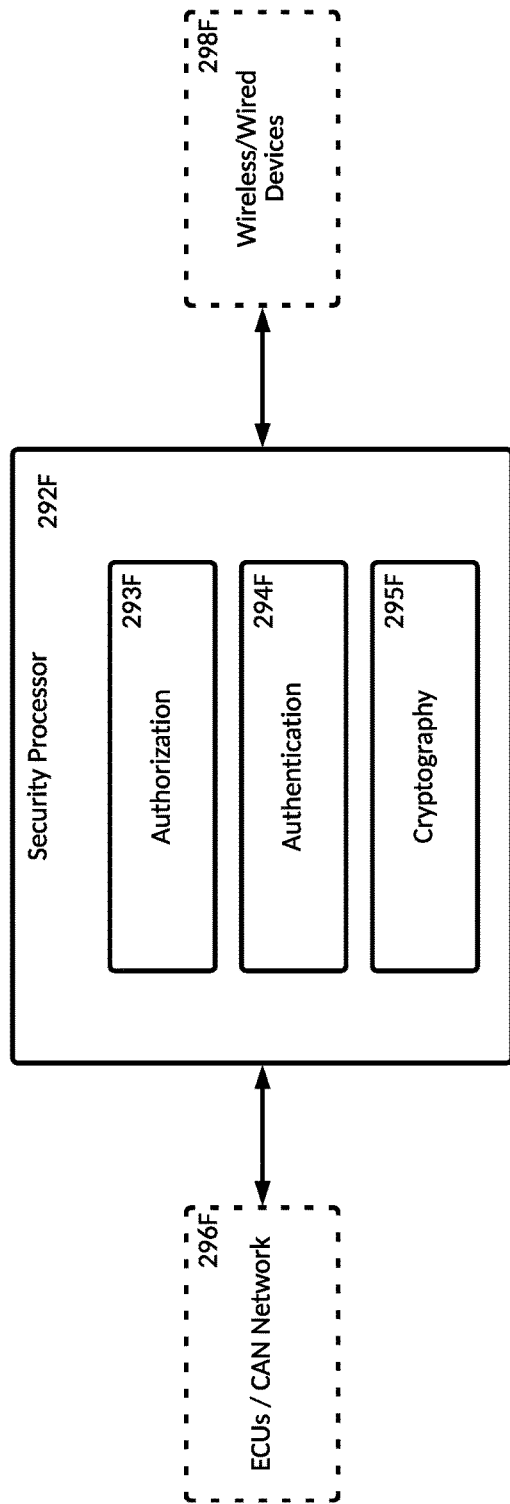
FIG. 2N illustrates yet a further diagram depicting an example of a transport interacting with a security processor and a wireless device, according to example embodiments.

FIG. 2N illustrates yet a further diagram 290F depicting an example of a transport interacting with a security processor and a wireless device, according to example embodiments. In some embodiments, the computer 224 shown in FIG. 2B may include security processor 292F as shown in the process 290F of the example of FIG. 2N. In particular, the security processor 292F may perform authorization, authentication, cryptography (e.g., encryption), and the like, for data transmissions that are sent between ECUs and other devices on a CAN bus of a vehicle, and also data messages that are transmitted between different vehicles.

In the example of FIG. 2N, the security processor 292F may include an authorization module 293F, an authentication module 294F, and a cryptography module 295F. The security processor 292F may be implemented within the transport's computer and may communicate with other transport elements, for example, the ECUs/CAN network 296F, wired and wireless devices 298F such as wireless network interfaces, input ports, and the like. The security processor 292F may ensure that data frames (e.g., CAN frames, etc.) that are transmitted internally within a transport (e.g., via the ECUs/CAN network 296F) are secure. Likewise, the security processor 292F can ensure that messages transmitted between different transports and devices attached or connected via a wire to the transport's computer are also secured.

For example, the authorization module 293F may store passwords, usernames, PIN codes, biometric scans, and the like for different transport users. The authorization module 293F may determine whether a user (or technician) has permission to access certain settings such as a transport's computer. In some embodiments, the authorization module may communicate with a network interface to download any necessary authorization information from an external server. When a user desires to make changes to the transport settings or modify technical details of the transport via a console or GUI within the transport or via an attached/connected device, the authorization module 293F may require the user to verify themselves in some way before such settings are changed. For example, the authorization module 293F may require a username, a password, a PIN code, a biometric scan, a predefined line drawing or gesture, and the like. In response, the authorization module 293F may determine whether the user has the necessary permissions (access, etc.) being requested.

The authentication module 294F may be used to authenticate internal communications between ECUs on the CAN network of the vehicle. As an example, the authentication module 294F may provide information for authenticating communications between the ECUS. As an example, the authentication module 294F may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module 294F may also provide a list of ECUs that are exempt (safe list) and that do not need to use the authentication bits. The authentication module 294F may communicate with a remote server to retrieve updates to the bit signature algorithm and the like.

The encryption module 295F may store asymmetric key pairs to be used by the transport to communicate with other external user devices and transports. For example, the encryption module 295F may provide a private key to be used by the transport to encrypt/decrypt communications, while the corresponding public key may be provided to other user devices and transports to enable the other devices to decrypt/encrypt the communications. The encryption module 295F may communicate with a remote server to receive new keys, updates to keys, keys of new transports, users, etc., and the like. The encryption module 295F may also transmit any updates to a local private/public key pair to the remote server.

Figure 3A:
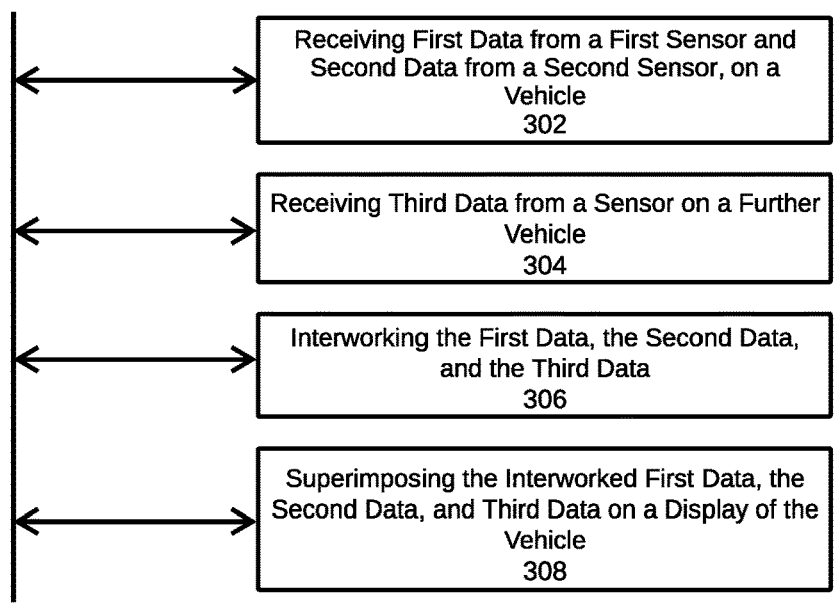
FIG. 3A illustrates a flow diagram, according to example embodiments.

FIG. 3A illustrates a flow diagram 300, according to example embodiments. Referring to FIG. 3A, the flow diagram 300 includes one or more of receiving first data from a first sensor and second data from a second sensor, on a vehicle 302, receiving third data from a sensor on a further vehicle, where the third data is not observable by the first sensor 304, interworking the first data, the second data, and the third data 306, and superimposing the interworked first data, the second data, and third data on a display of the vehicle 308.

Figure 3B:
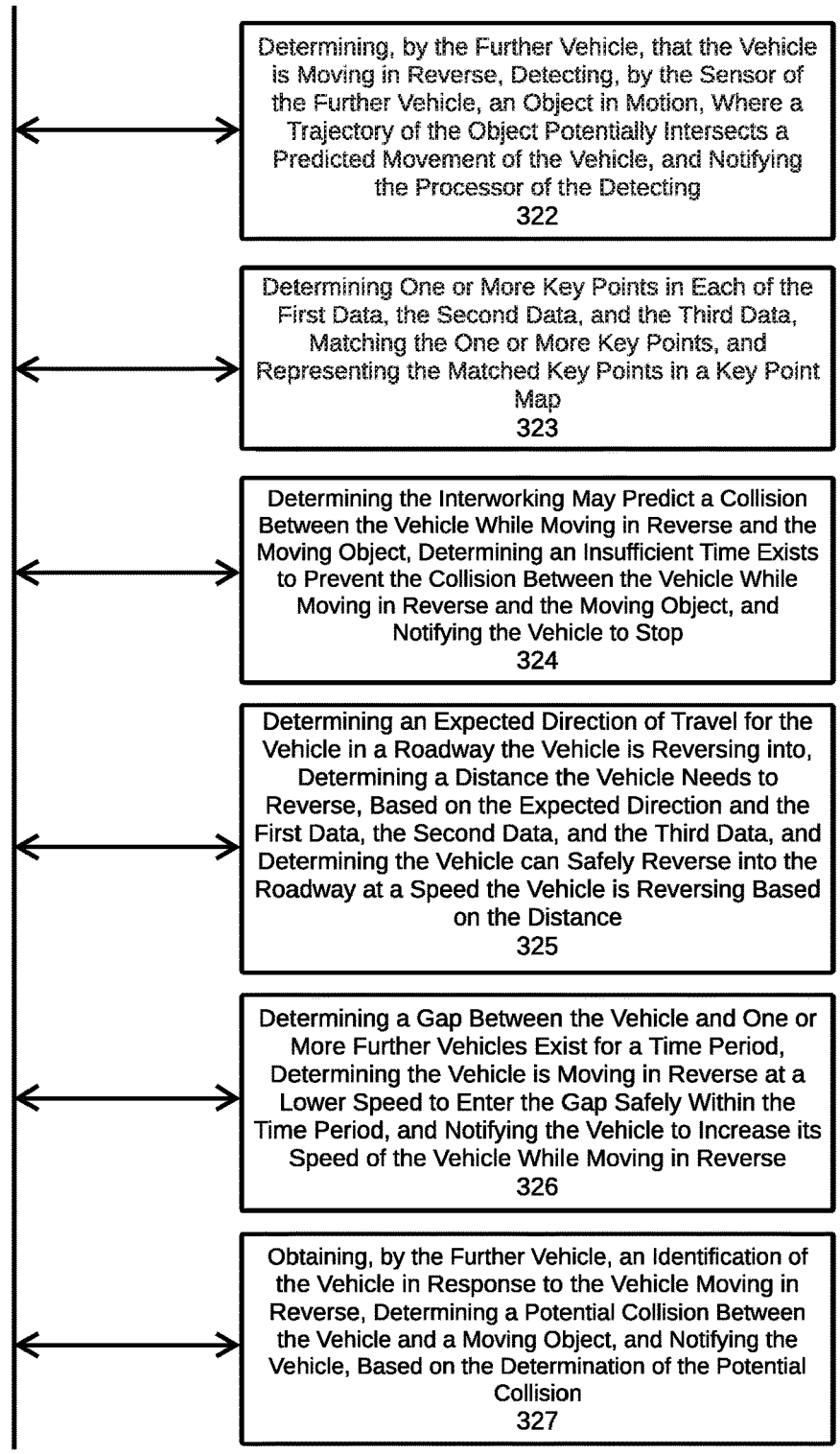
FIG. 3B illustrates another flow diagram, according to example embodiments.

FIG. 3B illustrates another flow diagram 320, according to example embodiments. Referring to FIG. 3B, the flow diagram 320 includes one or more of determining, by the further vehicle, that the vehicle is moving in reverse, detecting, by the sensor of the further vehicle, an object in motion, where a trajectory of the object potentially intersects a predicted movement of the vehicle, and notifying the processor of the detecting 322, determining one or more key points in each of the first data, the second data, and the third data, matching the one or more key points, and representing the matched key points in a key point map 323, determining the interworking may predict a collision between the vehicle while moving in reverse and the moving object, determining an insufficient time exists to prevent the collision between the vehicle while moving in reverse and the moving object, and notifying the vehicle to stop 324, determining an expected direction of travel for the vehicle in a roadway the vehicle is reversing into, determining a distance the vehicle needs to reverse, based on the expected direction and the first data, the second data, and the third data, and determining the vehicle can safely reverse into the roadway at a speed the vehicle is reversing based on the distance 325, determining a gap between the vehicle and one or more further vehicles exist for a time period, determining the vehicle is moving in reverse at a lower speed to enter the gap safely within the time period, and notifying the vehicle to increase its speed of the vehicle while moving in reverse 326, and obtaining, by the further vehicle, an identification of the vehicle in response to the vehicle moving in reverse, determining a potential collision between the vehicle and a moving object, and notifying the vehicle, based on the determination of the potential collision 327.

Figure 3C:
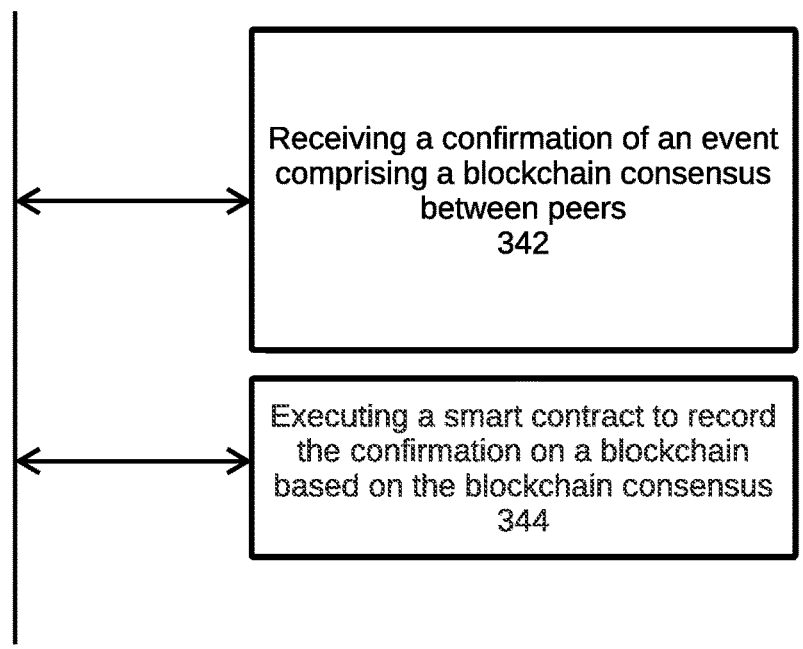
FIG. 3C illustrates yet another flow diagram, according to example embodiments.

FIG. 3C illustrates yet another flow diagram 340, according to example embodiments. Referring to FIG. 3C, the flow diagram includes one or more of receiving a confirmation of an event from one or more elements described or depicted herein, wherein the confirmation comprises a blockchain consensus between peers represented by any of the elements 342 and executing a smart contract to record the confirmation on a blockchain-based on the blockchain consensus 344.

Figure 4:
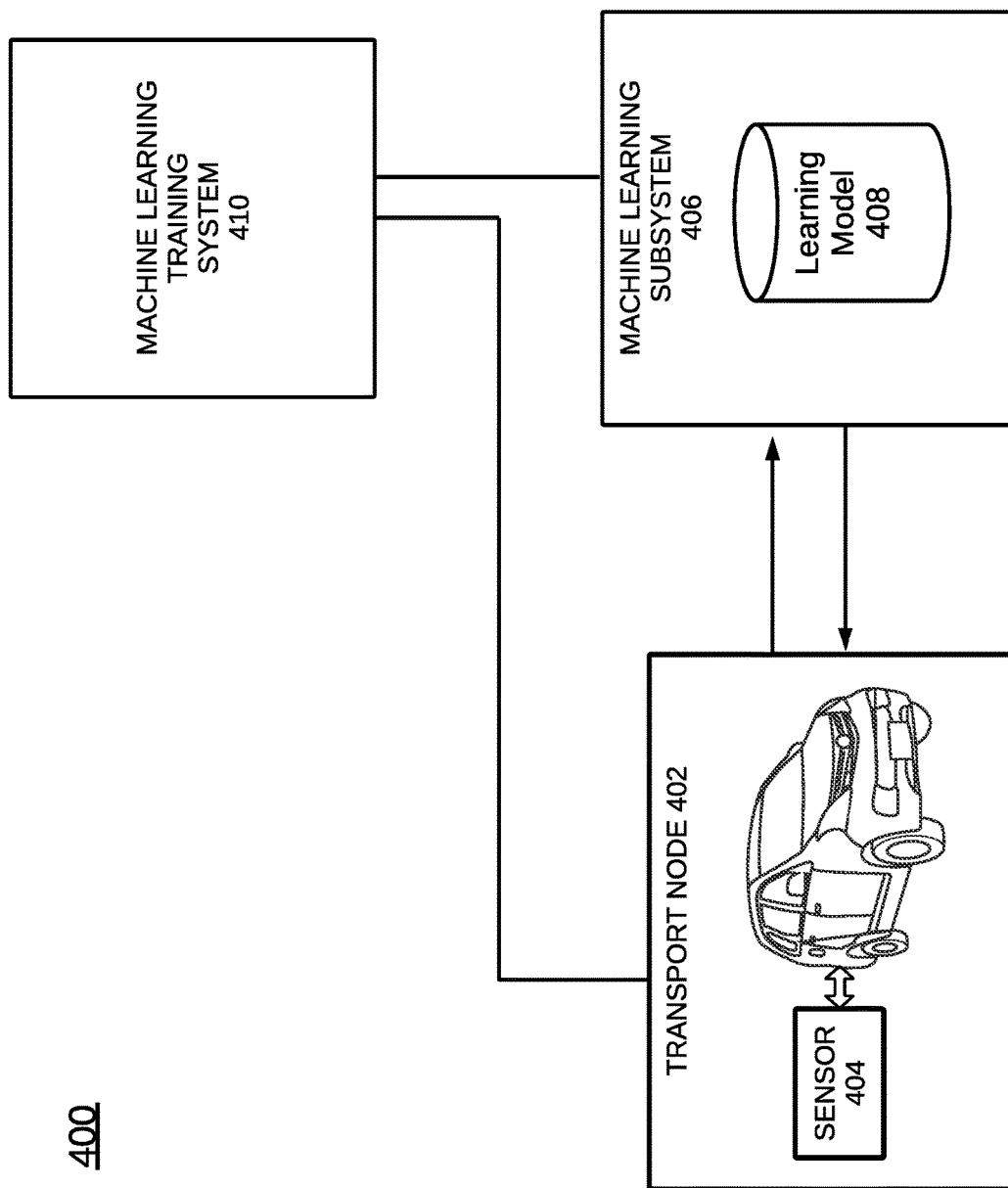
FIG. 4 illustrates a machine learning transport network diagram, according to example embodiments.

FIG. 4 illustrates a machine learning transport network diagram 400, according to example embodiments. The network 400 includes a transport 402 that interfaces with a machine learning subsystem 406. The transport includes one or more sensors 404.

The machine learning subsystem 406 contains a learning model 408, which is an artifact created by a machine learning training system 410 that generates predictions by finding patterns in one or more training data sets. In some embodiments, the machine learning subsystem 406 resides in the transport node 402. An artifact is used to describe an output created by a training process, such as a checkpoint, a file, or a model. In other embodiments, the machine learning subsystem 406 resides outside of the transport node 402.

The transport 402 sends data from the one or more sensors 404 to the machine learning subsystem 406. The machine learning subsystem 406 provides the one or more sensor 404 data to the learning model 408, which returns one or more predictions. The machine learning subsystem 406 sends one or more instructions to the transport 402 based on the predictions from the learning model 408.

In a further embodiment, the transport 402 may send the one or more sensor 404 data to the machine learning training system 410. In yet another example, the machine learning subsystem 406 may send the sensor 404 data to the machine learning subsystem 410. One or more of the applications, features, steps, solutions, etc., described and/or depicted herein may utilize the machine learning network 400 as described herein.

Figure 5A:
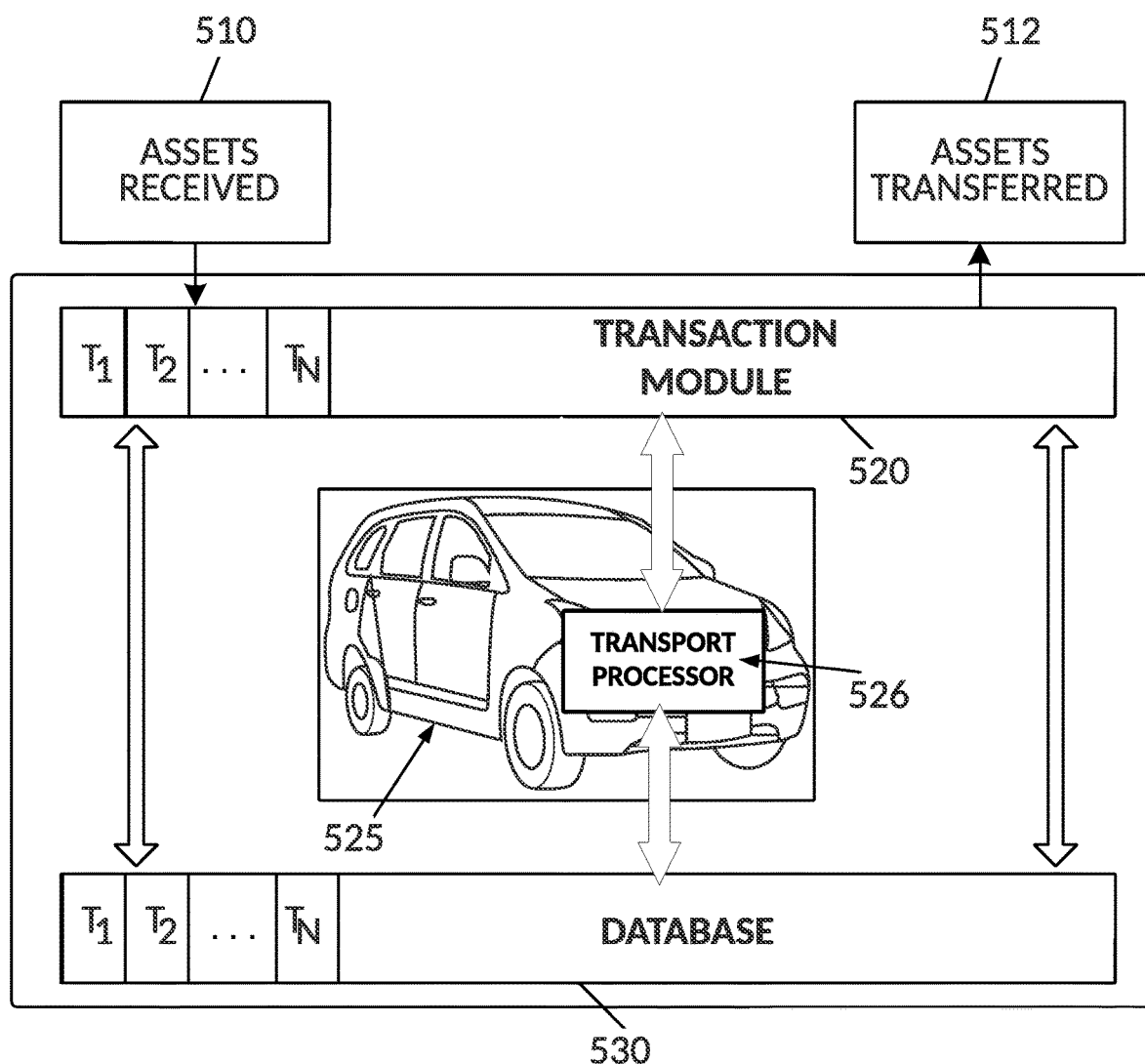
FIG. 5A illustrates an example vehicle configuration for managing database transactions associated with a vehicle, according to example embodiments.

FIG. 5A illustrates an example vehicle configuration 500 for managing database transactions associated with a vehicle, according to example embodiments. Referring to FIG. 5A, as a particular transport/vehicle 525 is engaged in transactions (e.g., vehicle service, dealer transactions, delivery/pickup, transportation services, etc.), the vehicle may receive assets 510 and/or expel/transfer assets 512 according to a transaction(s). A transport processor 526 resides in the vehicle 525 and communication exists between the transport processor 526, a database 530, a transport processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the transport, may be off-board the transport, may be accessed directly and/or through a network, or be accessible to the transport.

Figure 5B:
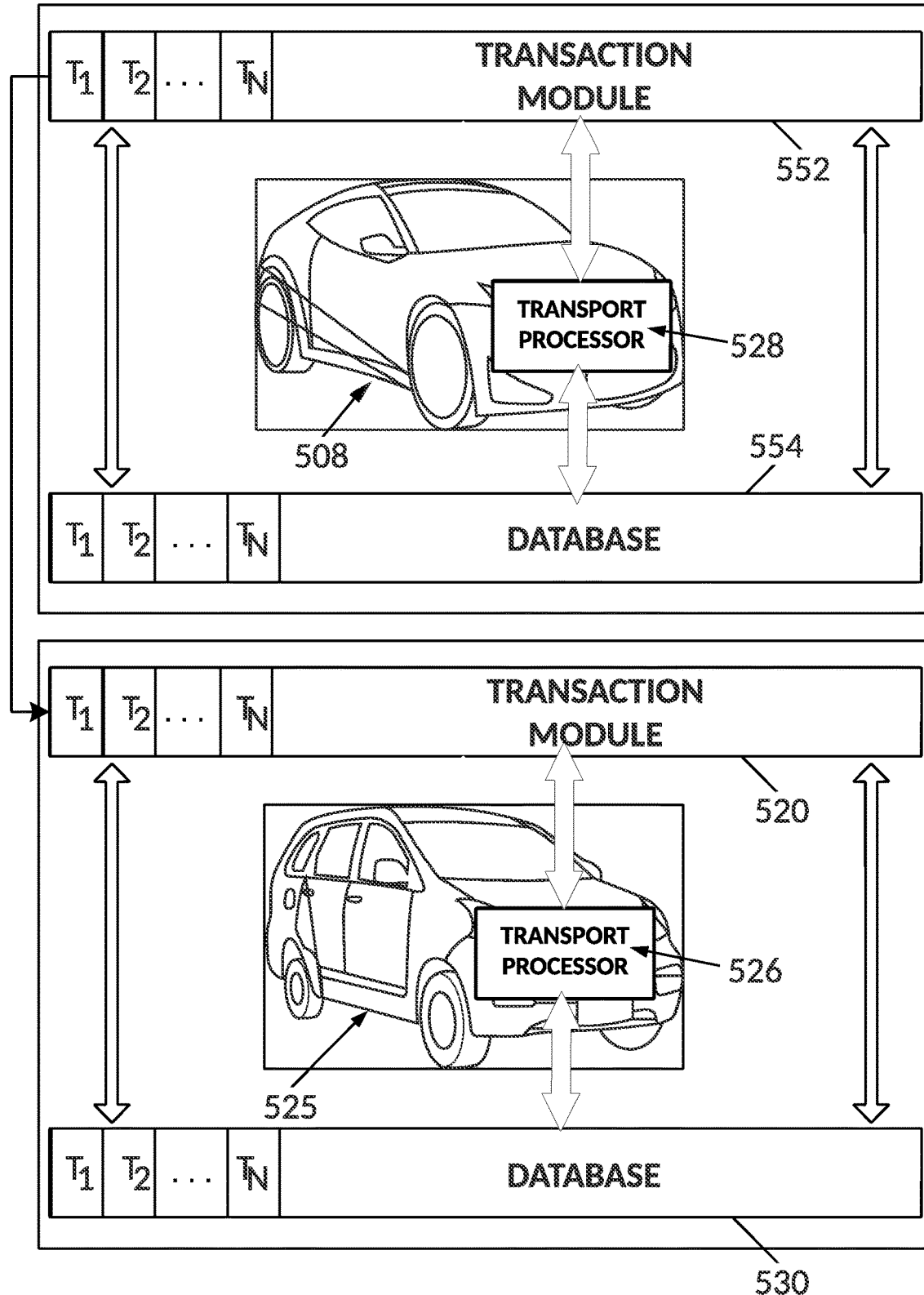
FIG. 5B illustrates another example vehicle configuration for managing database transactions conducted among various vehicles, according to example embodiments.

FIG. 5B illustrates an example vehicle configuration 550 for managing database transactions conducted among various vehicles, according to example embodiments. The vehicle 525 may engage with another vehicle 508 to perform various actions such as to share, transfer, acquire service calls, etc. when the vehicle has reached a status where the services need to be shared with another vehicle. For example, the vehicle 508 may be due for a battery charge and/or may have an issue with a tire and may be in route to pick up a package for delivery. A transport processor 528 resides in the vehicle 508 and communication exists between the transport processor 528, a database 554, and the transaction module 552. The vehicle 508 may notify another vehicle 525, which is in its network and which operates on its blockchain member service. A transport processor 526 resides in the vehicle 525 and communication exists between the transport processor 526, a database 530, the transport processor 526 and a transaction module 520. The vehicle 525 may then receive the information via a wireless communication request to perform the package pickup from the vehicle 508 and/or from a server (not shown). The transactions are logged in the transaction modules 552 and 520 of both vehicles. The credits are transferred from vehicle 508 to vehicle 525 and the record of the transferred service is logged in the database 530/554 assuming that the blockchains are different from one another, or are logged in the same blockchain used by all members. The database 554 can be one of a SQL database, an RDBMS, a relational database, a non-relational database, a blockchain, a distributed ledger, and may be on board the transport, may be off-board the transport, may be accessible directly and/or through a network.

Figure 6A:
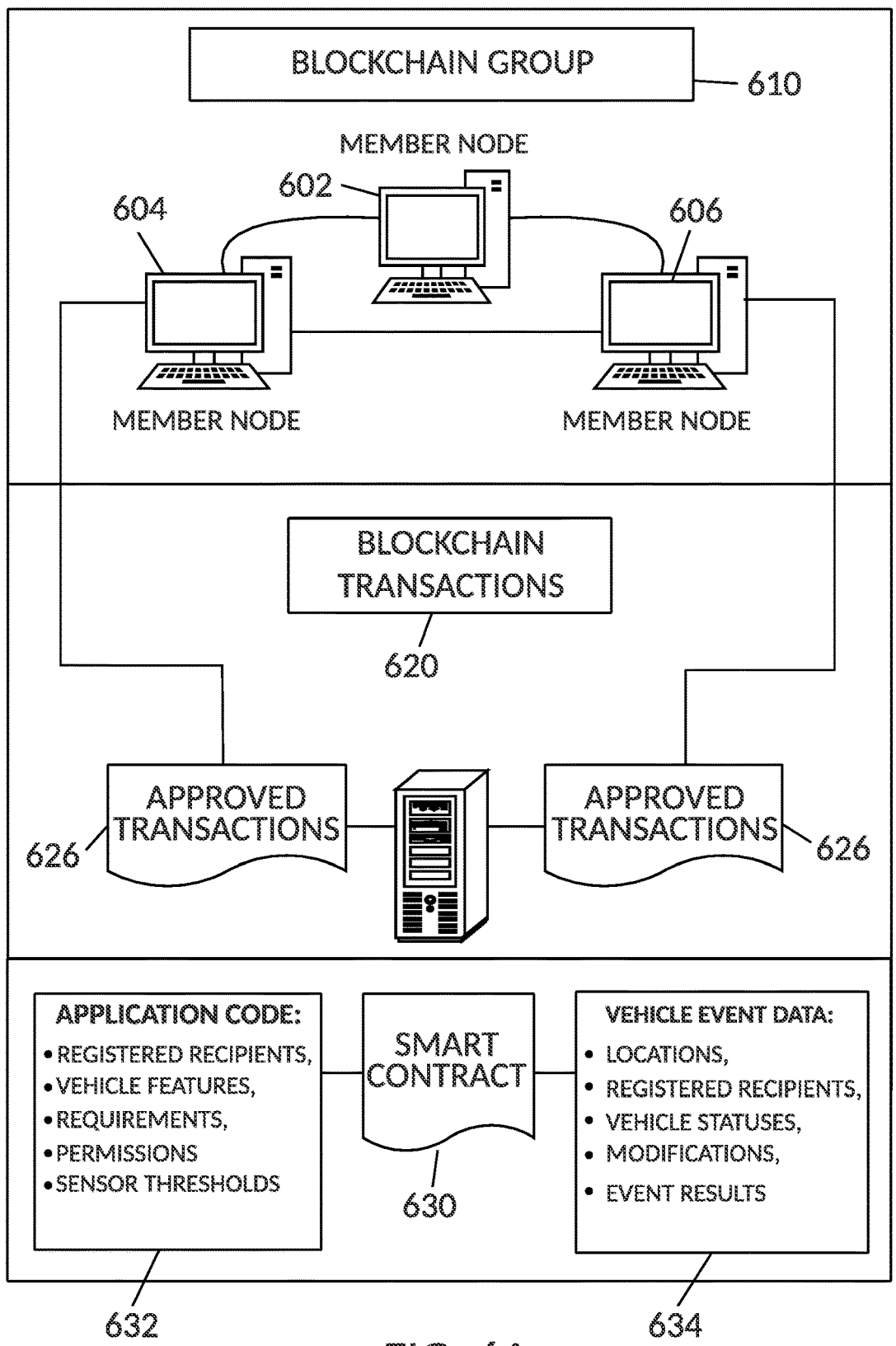
FIG. 6A illustrates a blockchain architecture configuration, according to example embodiments.

FIG. 6A illustrates a blockchain architecture configuration 600, according to example embodiments. Referring to FIG. 6A, the blockchain architecture 600 may include certain blockchain elements, for example, a group of blockchain member nodes 602-606 as part of a blockchain group 610. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 620 are stored in memory of computers as the transactions are received and approved by the consensus model dictated by the members' nodes. Approved transactions 626 are stored in current blocks of the blockchain and committed to the blockchain via a committal procedure, which includes performing a hash of the data contents of the transactions in a current block and referencing a previous hash of a previous block. Within the blockchain, one or more smart contracts 630 may exist that define the terms of transaction agreements and actions included in smart contract executable application code 632, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 634, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 630, which are then stored in a blockchain. For example, sensor thresholds stored in the smart contract can be used as the basis for whether a detected service is necessary and when and where the service should be performed.

Figure 6B:
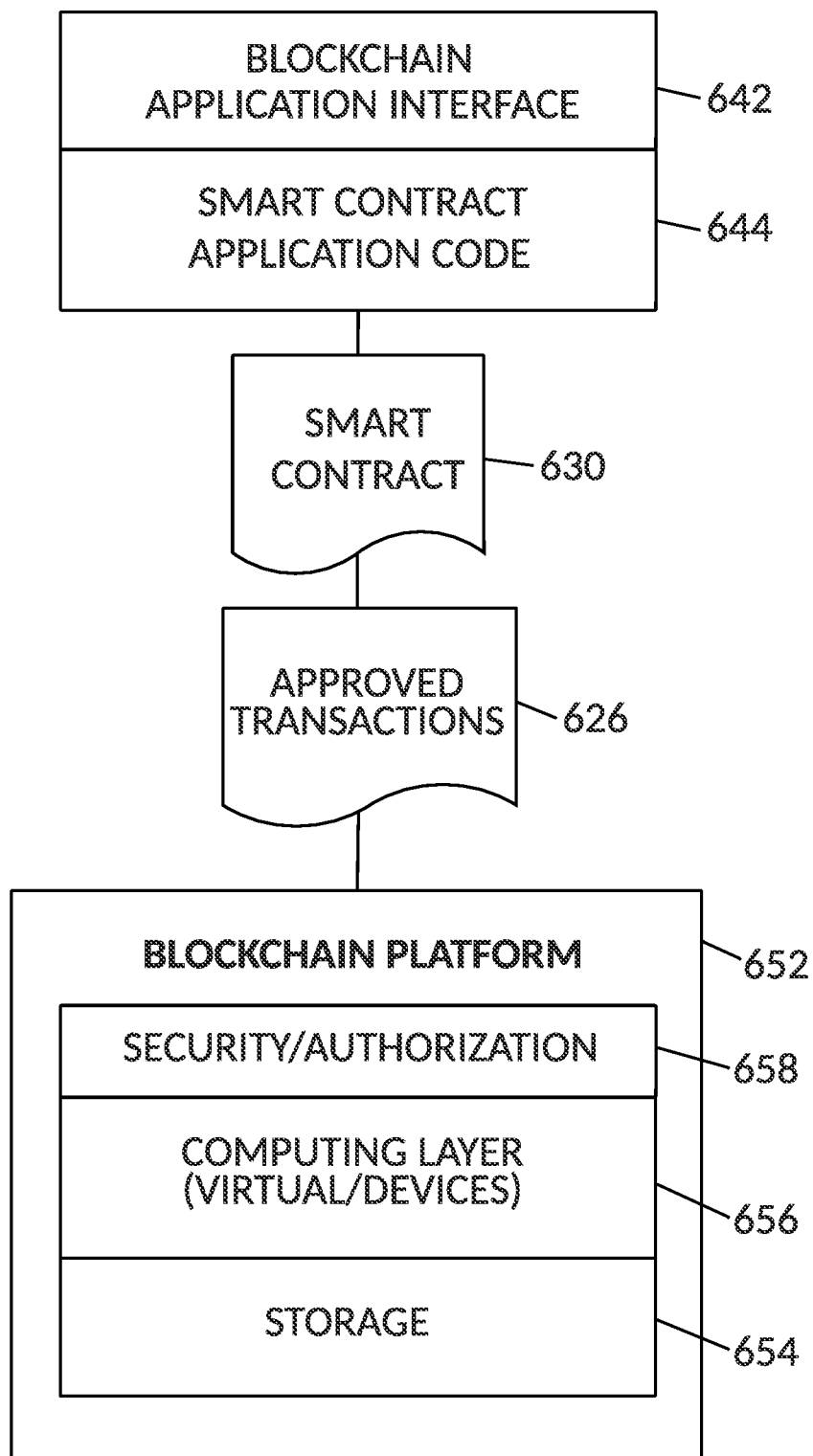
FIG. 6B illustrates another blockchain configuration, according to example embodiments.

FIG. 6B illustrates a shared ledger configuration, according to example embodiments. Referring to FIG. 6B, the blockchain logic example 640 includes a blockchain application interface 642 as an API or plug-in application that links to the computing device and execution platform for a particular transaction. The blockchain configuration 640 may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code 644 provides a basis for the blockchain transactions by establishing application code, which when executed causes the transaction terms and conditions to become active. The smart contract 630, when executed, causes certain approved transactions 626 to be generated, which are then forwarded to the blockchain platform 652. The platform includes a security/authorization 658, computing devices, which execute the transaction management 656 and a storage portion 654 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 6A and 6B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 6C:
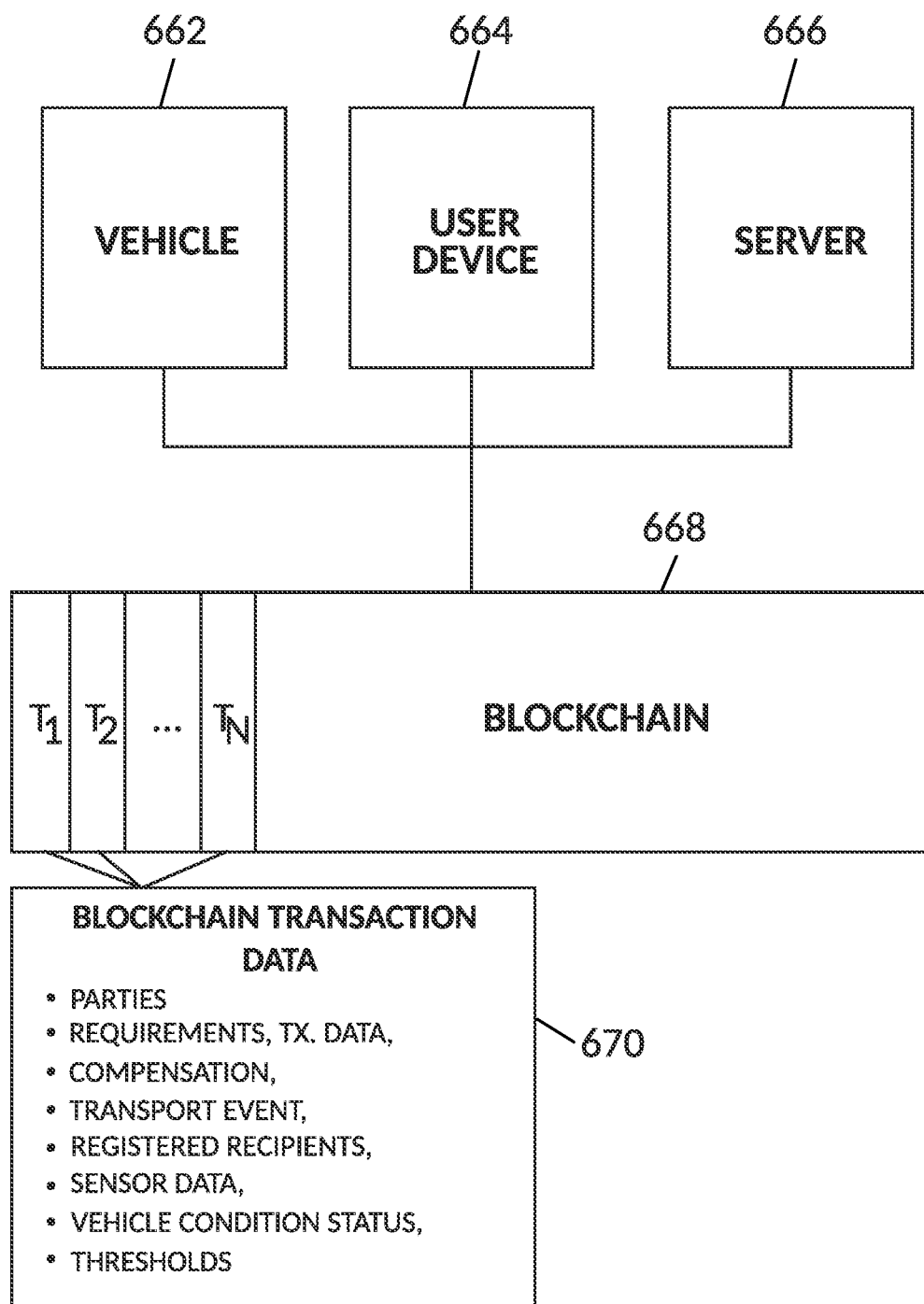
FIG. 6C illustrates a blockchain configuration for storing blockchain transaction data, according to example embodiments.

FIG. 6C illustrates a blockchain configuration for storing blockchain transaction data, according to example embodiments. Referring to FIG. 6C, the example configuration 660 provides for the vehicle 662, the user device 664 and a server 666 sharing information with a distributed ledger (i.e., blockchain) 668. The server may represent a service provider entity inquiring with a vehicle service provider to share user profile rating information in the event that a known and established user profile is attempting to rent a vehicle with an established rated profile. The server 666 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 670 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 6D:
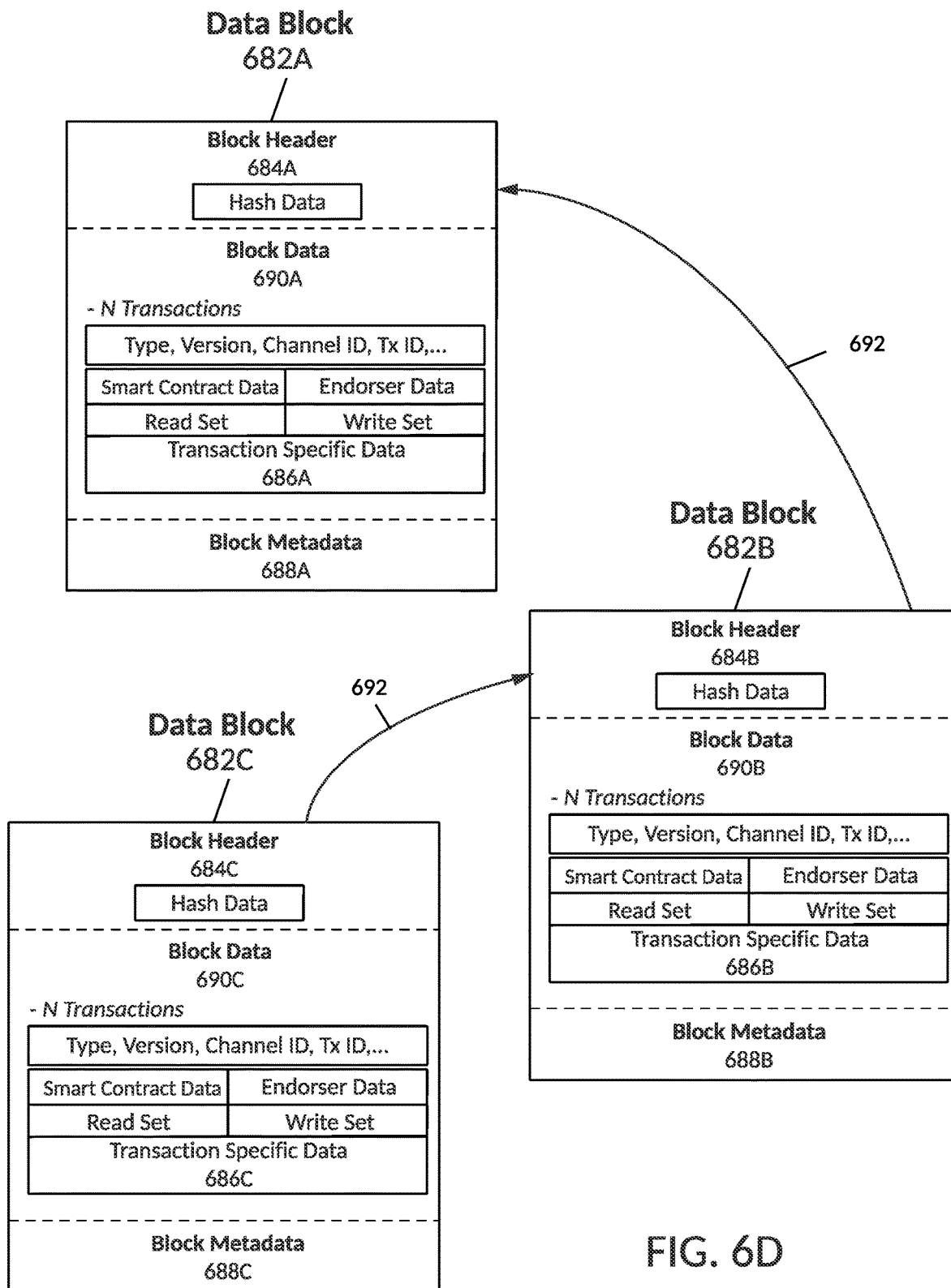
FIG. 6D illustrates example data blocks, according to example embodiments.

FIG. 6D illustrates blockchain blocks 680 that can be added to a distributed ledger, according to example embodiments, and contents of block structures 682A to 682n. Referring to FIG. 6D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 6D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing nodes create an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 6D, a block 682A (also referred to as a data block) that is stored on the blockchain and/or the distributed ledger may include multiple data segments such as a block header 684A to 684n, transaction-specific data 686A to 686n, and block metadata 688A to 688n. It should be appreciated that the various depicted blocks and their contents, such as block 682A and its contents are merely for purposes of an example and are not meant to limit the scope of the example embodiments. In some cases, both the block header 684A and the block metadata 688A may be smaller than the transaction-specific data 686A, which stores entry data; however, this is not a requirement. The block 682A may store transactional information of N entries (e.g., 100, 500, 1000, 2000, 3000, etc.) within the block data 690A to 690n. The block 682A may also include a link to a previous block (e.g., on the blockchain) within the block header 684A. In particular, the block header 684A may include a hash of a previous block's header. The block header 684A may also include a unique block number, a hash of the block data 690A of the current block 682A, and the like. The block number of the block 682A may be unique and assigned in an incremental/sequential order starting from zero. The first block in the blockchain may be referred to as a genesis block, which includes information about the blockchain, its members, the data stored therein, etc.

The block data 690A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 690A may also store transaction-specific data 686A, which adds additional information to the hash-linked chain of blocks in the blockchain. Accordingly, the data 686A can be stored in an immutable log of blocks on the distributed ledger. Some of the benefits of storing such data 686A are reflected in the various embodiments disclosed and depicted herein. The block metadata 688A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 610A and a validation code identifying whether an entry was valid/invalid.

The other blocks 682B to 682n in the blockchain also have headers, files, and values. However, unlike the first block 682A, each of the headers 684A to 684n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 692, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
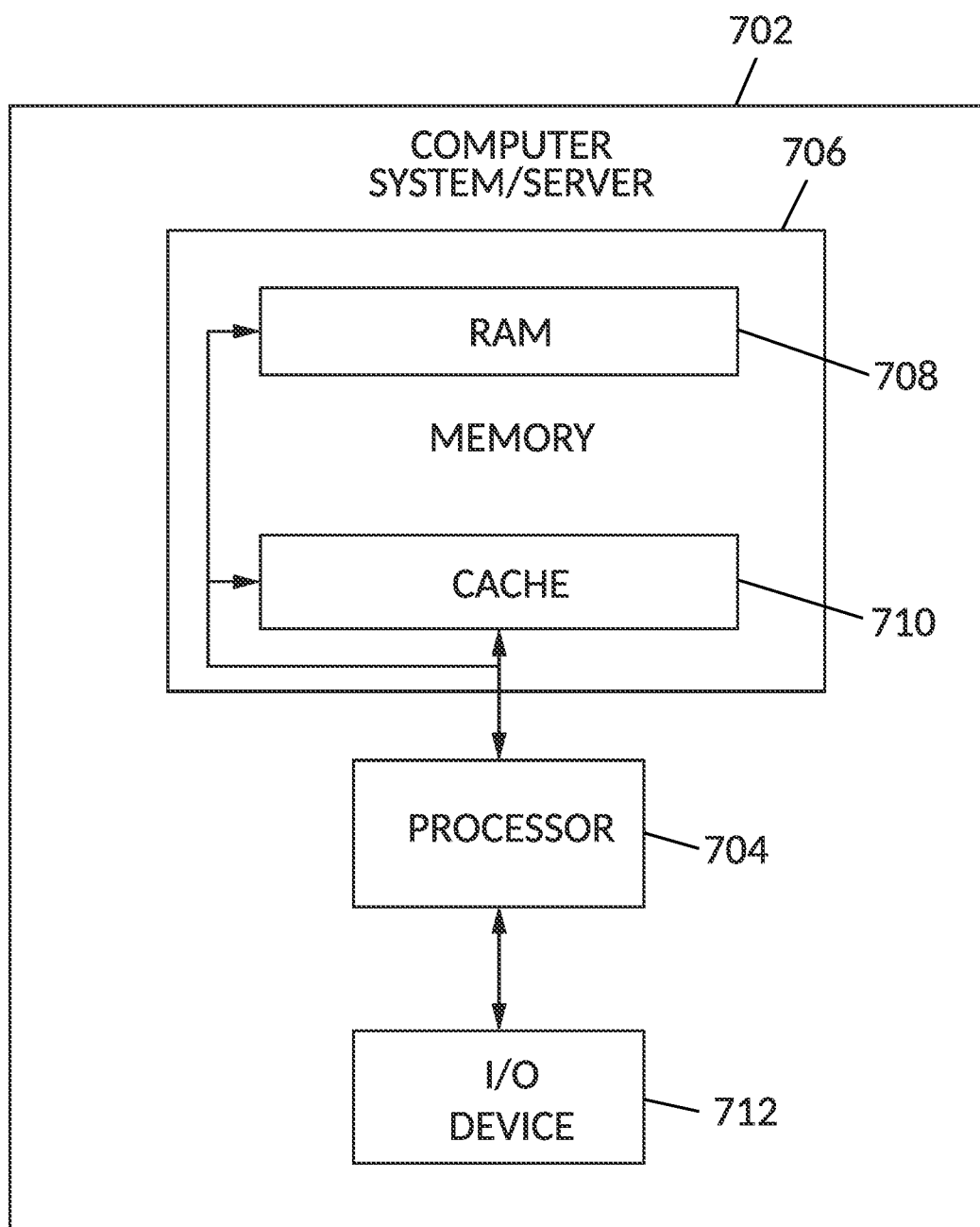
FIG. 7 illustrates an example system that supports one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one example, implements the flow diagrams of the other figures. The system memory 706 can include computer system readable media in the form of volatile memory, such as random-access memory (RAM) 708 and/or cache memory 710. Computer system/server 702 may further include other removable/non-removable, volatile/non-volatile computer system storage media. By way of example only, memory 706 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility, having a set (at least one) of program modules, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices via an I/O device 712 (such as an I/O adapter), which may include a keyboard, a pointing device, a display, a voice recognition module, etc., one or more devices that enable a user to interact with computer system/server 702, and/or any devices (e.g., network card, modem, etc.) that enable computer system/server 702 to communicate with one or more other computing devices. Such communication can occur via I/O interfaces of the device 712. Still yet, computer system/server 702 can communicate with one or more networks such as a local area network (LAN), a general wide area network (WAN), and/or a public network (e.g., the Internet) via a network adapter. As depicted, device 712 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving, by a processor, first data from a first sensor and second data from a second sensor, on a vehicle;
   receiving, by the processor, third data from a sensor on a further vehicle, wherein the third data is not observable by the first sensor;
   interworking, by the processor, the first data, the second data, and the third data; and
   superimposing, by the processor, the interworked first data, second data, and third data on a display of the vehicle;
   wherein the third data includes a moving object not present in the first data or the second data;
   wherein the interworking predicts a collision between the moving object and the vehicle while moving in reverse;
   wherein the vehicle is notified to stop.

2. The method of claim 1, wherein receiving the third data from the sensor on the further vehicle comprises:
   determining, by the further vehicle, that the vehicle is moving in reverse;
   detecting, by the sensor of the further vehicle, an object in motion, wherein a trajectory of the object potentially intersects a predicted movement of the vehicle; and
   notifying the processor of the detecting.

3. The method of claim 1, wherein interworking the first data, the second data, and the third data comprises:
   determining one or more key points in each of the first data, the second data, and the third data;
   matching the one or more key points; and
   representing the matched key points in a key point map.

4. The method of claim 1, comprising:
   determining an expected direction of travel for the vehicle in a roadway the vehicle is reversing into;
   determining a distance the vehicle needs to reverse, based on the expected direction and the first data, the second data, and the third data; and
   determining the vehicle can safely reverse into the roadway at a speed the vehicle is reversing based on the distance.

5. The method of claim 1, comprising:
   determining a gap between the vehicle and one or more further vehicles exist for a time period;
   determining the vehicle is moving in reverse at a lower speed to enter the gap safely within the time period; and
   notifying the vehicle to increase its speed of the vehicle while moving in reverse.

6. The method of claim 1, comprising:
   obtaining, by the further vehicle, an identification of the vehicle in response to the vehicle moving in reverse;
   determining a potential collision between the vehicle and a moving object; and
   notifying the vehicle, based on the determination of the potential collision.

7. A system, comprising:
   a processor; and
   a memory, coupled to the processor, comprising instructions that when executed by the processor are configured to:
      receive, by a processor, first data from a first sensor and second data from a second sensor, on a vehicle;
      receive, by the processor, third data from a sensor on a further vehicle, wherein the third data is not observable by the first sensor;
      interwork, by the processor, the first data, the second data, and the third data; and
      superimpose, by the processor, the interworked first data, second data, and third data on a display of the vehicle;
      wherein the third data includes a moving object not present in the first data or the second data;
      wherein the interworked first data, second data, and third data predict a collision between the moving object and the vehicle while the vehicle moves in reverse;
      wherein the vehicle is notified to stop.

8. The system of claim 7, wherein the processor receives the third data from the sensor on the further vehicle comprises the instructions are configured to:
   determine, by the further vehicle, that the vehicle moves in reverse;
   detect, by the sensor of the further vehicle, an object in motion, wherein a trajectory of the object potentially intersects a predicted movement of the vehicle; and
   notify the processor of the further vehicle detects the object in motion.

9. The system of claim 7, wherein the processor interworks the first data, the second data, and the third data comprises the instructions are configured to:
   determine one or more key points in each of the first data, the second data, and the third data;
   match the one or more key points; and
   represent the matched key points in a key point map.

10. The system of claim 7, wherein the instructions are configured to:
    determine an expected direction of travel for the vehicle in a roadway the vehicle reverses into;
    determine a distance the vehicle needs to reverse, based on the expected direction and the first data, the second data, and the third data; and
    determine the vehicle can safely reverse into the roadway at a speed the vehicle moves in reverse based on the distance.

11. The system of claim 7, wherein the instructions are configured to:
    determine a gap between the vehicle and one or more further vehicles exist for a time period;
    determine the vehicle moves in reverse at a lower speed to enter the gap safely within the time period; and
    notify the vehicle to increase its speed of the vehicle while the vehicle moves in reverse.

12. The system of claim 7, wherein the instructions are configured to:
    obtain, by the further vehicle, an identification of the vehicle in response to the vehicle moves in reverse;
    determine a potential collision between the vehicle and a moving object; and
    notify the vehicle, based on the determination of the potential collision.

13. A non-transitory computer readable storage medium comprising instructions, that when read by a processor, cause the processor to perform:
    receiving, by a processor, first data from a first sensor and second data from a second sensor, on a vehicle;
    receiving, by the processor, third data from a sensor on a further vehicle, wherein the third data is not observable by the first sensor;
    interworking, by the processor, the first data, the second data, and the third data; and
    superimposing, by the processor, the interworked first data, second data, and third data on a display of the vehicle;
    wherein the third data includes a moving object not present in the first data or the second data;

wherein the interworking predicts a collision between the moving object and the vehicle while moving in reverse;
wherein the vehicle is notified to stop.

14. The non-transitory computer readable storage medium of claim 13, wherein receiving the third data from the sensor on the further vehicle comprises the instructions cause the processor to perform:
   determining, by the further vehicle, that the vehicle is moving in reverse;
   detecting, by the sensor of the further vehicle, an object in motion, wherein a trajectory of the object potentially intersects a predicted movement of the vehicle; and
   notifying the processor of the detecting.

15. The non-transitory computer readable storage medium of claim 13, wherein interworking the first data, the second data, and the third data comprises the instructions cause the processor to perform:
   determining one or more key points in each of the first data, the second data, and the third data;
   matching the one or more key points; and
   representing the matched key points in a key point map.

16. The non-transitory computer readable storage medium of claim 13, wherein the instructions cause the processor to perform:
   determining an expected direction of travel for the vehicle in a roadway the vehicle is reversing into;
   determining a distance the vehicle needs to reverse, based on the expected direction and the first data, the second data, and the third data; and
   determining the vehicle can safely reverse into the roadway at a speed the vehicle is reversing based on the distance.

17. The non-transitory computer readable storage medium of claim 13, wherein the instructions cause the processor to perform:
   determining a gap between the vehicle and one or more further vehicles exist for a time period;
   determining the vehicle is moving in reverse at a lower speed to enter the gap safely within the time period; and
   notifying the vehicle to increase its speed of the vehicle while moving in reverse.

* * * * *